United States Patent Office 3,127,345
Patented Mar. 31, 1964

3,127,345
TREATMENT OF OIL WELLS AND OIL WELL EQUIPMENT EMPLOYING METHYLOL PHENOL DERIVATIVES
Melvin De Groote, St. Louis, and Kwan-ting Shen, Brentwood, Mo., assignors to Petrolite Corporation, a corporation of Delaware
No Drawing. Original application May 12, 1960, Ser. No. 28,514. Divided and this application Apr. 11, 1961, Ser. No. 102,094
20 Claims. (Cl. 252—8.55)

This application is a division of our copending application Serial No. 28,514, filed May 12, 1960, which latter application is a continuation-in-part of our copending application Serial No. 730,510, filed April 24, 1958, now abandoned. See also our copending application Serial No. 804,087, filed April 6, 1959, now abandoned, which is a division of Serial No. 730,510. This invention relates to processes for the treatment of oil wells and oil well equipment employing (1) oxyalkylated, (2) acylated, (3) oxyalkylated then acylated, (4) acylated then oxyalkylated, and (5) acylated, then oxyalkylated and then acylated, monomeric polyaminomethyl phenols. These substituted phenols are produced by a process which is characterized by reacting a preformed methylol phenol (i.e., formed prior to the addition of the polyamine) with at least one mole of a secondary polyamine per equivalent of methylol group on the phenol, in the absence of an extraneous catalyst (in the case of an aqueous reaction mixture, the pH of the reaction mixture being determined solely by the methylol phenol and the secondary polyamine), until about one mole of water per equivalent of methylol group is removed; and then reacting this product with (1) an oxyalkylating agent, (2) an acylating agent, (3) an oxyalkylating agent then an acylating agent, (4) an acylating agent then an oxyalkylating agent or (5) an acylating agent then an oxyalkylating agent and then an acylating agent.

The reasons for the unexpected monomeric form and properties of the polyaminomethyl phenol are not understood. However, we have discovered that when (1) A preformed methylolphenol (i.e., formed prior to the addition of the polyamine) employed as a starting material is reacted with
(2) A polyamine which contains at least one secondary amino group
(3) In amounts of at least one mole of secondary polyamine per equivalent of methylol group on the phenol,
(4) In the absence of an extraneous catalyst, until
(5) About one mole of water per equivalent of methylol group is removed, then a monomeric polyaminomethyl phenol is produced which is capable of being oxyalkylated, acylated, oxyalkylated then acylated, or acylated then oxyalkylated, or acylated, then oxyalkylated and then acylated to provide the superior products employed in the processes of this invention. All of the above five conditions are critical for the production of these monomeric polyamino-methyl phenols.

In contrast, if the methylol phenol is not preformed but is formed in the presence of the polyamine, or the preformed methylol phenol is condensed with the polyamine in the presence of an extraneous catalyst, either acidic or basic, for example, basic or alkaline materials such as NaOH, Ca(OH)$_2$, Na$_2$CO$_3$, sodium methylate, etc., a polymeric product is formed. Thus, if an alkali metal phenate is employed in place of the free phenol, or even if a lesser quantity of alkali metal is present than is required to form the phenate, a polymeric product is formed. Where a polyamine containing only primary amino groups and no secondary amino groups is reacted with a methylol phenol, a polymeric product is also produced. Similarly, where less than one mole of secondary amine is reacted per equivalent of methylol group, a polymeric product is also formed.

In general, the monomeric polyaminomethyl phenols are prepared by condensing the methylol phenol with the secondary amine as disclosed above, said condensation being conducted at a temperature sufficiently high to eliminate water but below the pyrolytic point of the reactants and product, for example, at 80° to 200° C., but preferably at 100° to 150° C. During the course of the condensation water can be removed by any suitable means, for example, by use of an azeotroping agent, reduced pressure, combinations thereof, etc. Measuring the water given off during the reaction is a convenient method of judging completion of the reaction.

The classes of methylol phenols employed in the condensation are as follows:

*Monophenols.*—A phenol containing 1, 2 or 3 methylol groups in the ortho or para position (i.e., the 2, 4, 6 positions), the remaining positions on the ring containing hydrogen or groups which do not interfere with the polyamine-methylol group condensation, for example, alkyl, alkenyl, cycloalkyl, phenol, halogen, and alkoxy, etc., groups, and having but one nuclear linked hydroxyl group.

*Diphenols.*—One type is a diphenol containing two hydroxybenzene radicals directly joined together through the ortho or para (i.e., 2, 4, or 6) position with a bond joining the carbon of one ring with the carbon of the other ring, each hydroxybenzene radical containing 1 to 2 methylol groups in the 2, 4 or 6 positions, the remaining positions on each ring containing hydrogen or groups which do not interfere with the polyamine-methylol group condensation, for example, alkyl, alkenyl, cycloalkyl, phenyl, halogen, alkoxy, etc., groups, and having but two nuclear linked hydroxyl groups.

A second type is a diphenol containing two hydroxybenzene radicals joined together through the ortho or para (i.e., 2, 4, or 6 position) with a bridge joining the carbon of one ring to a carbon of the other ring, said bridge being, for example, alkylene, alkylidene, oxygen, carbonyl, sulfur, sulfoxide and sulfone, etc., each hydroxybenzene radical containing 1 to 2 methylol groups in the 2, 4, or 6 positions, the remaining positions on each ring containing hydrogen or groups which do not interfere with the polyamino-methylol group condensation, for example, alkyl, alkenyl, cycloalkyl, phenyl, halogen, alkoxy, etc., groups, and having but two nuclear linked hydroxyl groups.

The secondary polyamines employed in producing the condensate are illustrated by the following general formula:

where at least one of the R's contains an amino group and the R's contain alkyl, alkoxy, cycloalkyl, aryl, aralkyl, alkaryl radicals, and the corresponding radicals containing heterocyclic radicals, hydroxy radicals, etc. The R's may also be joined together to form heterocyclic polyamines. The preferred classes of polyamines are the alkylene polyamines, the hydroxylated alkylene polyamines, branched polyamines containing at least three primary amino groups, and polyamines containing cyclic amidine groups. The only limitation is that there shall be present in the polyamine at least one secondary amino group which is not bonded directly to a negative radical which reduces the basicity of the amine, such as a phenyl group.

An unusual feature of the products employed in the processes of the present invention is the discovery that methylol phenols react more readily under the herein specified conditions with secondary amino groups than with primary amino groups. Thus, where both primary and secondary amino groups are present in the same molecule, reaction occurs more readily with the secondary amino group. However, where the polyamine contains only primary amino groups, the product formed under reaction conditions as mentioned above is an insoluble resin. In contrast, where the same number of primary amino groups are present on the amine in addition to at least one secondary amino group, reaction occurs predominantly with the secondary amino group to form nonresinous derivatives. Thus, where trimethylol phenol is reacted with ethylene diamine, an insoluble resinous composition is produced. However, where diethylene triamine, a compound having just as many primary amino groups as ethylene diamine, is reacted, according to this invention a non-resinous product is unexpectedly formed.

The term "monomeric" as employed in the specification and claims refers to a polyaminomethylphenol containing within the molecular unit one aromatic unit corresponding to the aromatic unit derived from the starting methylol phenol and one polyamine unit for each methylol group originally in the phenol. This is in contrast to a polymeric or resinous polyaminomethyl phenol containing within the molecular unit more than one aromatic unit and/or more than one polyamino unit for each methylol group.

The monomeric products produced by the condensation of the methylol phenol and the secondary amine may be illustrated by the following "idealized" formula:

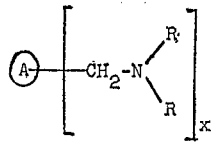

where A is the aromatic unit corresponding to that of the methylol reactant, and the remainder of the molecule is the polyaminomethyl radical, one for each of the original methylol groups.

This condensation reaction may be followed by oxyalkylation in the conventional manner, for example, by means of an alpha-beta alkylene oxide such as ethylene oxide, propylene oxide, butylene oxide, octylene oxide, a higher alkylene oxide, styrene oxide, glycide, methylglycide, etc., or combinations thereof. Depending on the particular application desired, one may combine a large proportion of alkylene oxide, particularly ethylene oxide, propylene oxide, a combination or alternate additions or propylene oxide and ethylene oxide, or smaller proportions thereof in relation to the methylol phenolamine condensation product. Thus, the molar ratio of alkylene oxide to amine condensate can range within wide limits, for example, from a 1:1 mole ratio to a ratio of 1000:1, or higher, but preferably 1 to 200. By proper control, desired hydrophilic or hydrophobic properties are imparted to the composition. As is well known, oxyalkylation reactions are conducted under a wide variety of conditions, at low or high pressures, at low or high temperatures, in the presence or absence of catalyst, solvent, etc. For instance oxyalkylation reactions can be carried out at temperatures of from 80–200° C., and pressures of from 10 to 200 p.s.i., and times of from 15 min. to several days. Preferably oxyalkylation reactions are carried out at 80 to 120° C. and 10 to 30 p.s.i. For conditions of oxylakylation reactions see U.S. Patent 2,792,369 and other patents mentioned therein.

As in the amine condensation, acylation is conducted at a temperature sufficiently high to eliminate water and below the pyrolytic point of the reactants and the reaction products. In general, the reaction is carried out at a temperature of from 140° to 280° C., but preferably at 140° to 200° C. In acylating, one should control the reaction so that the phenolic hydroxyls are not acylated. Because acyl halides and anhydrides are capable of reacting with phenolic hydroxyls, this type of acylation should be avoided. It should be realized that either oxyalkylation or acylation can be employed alone or each alternately, either one preceding the other. In addition, the amine condensate can be acylated, then oxyalkylated and then reacylated. The amount of acylation agent reacted will depend on reactive groups or the compounds and properties desired in the final product, for example, the molar ratios of acylation agent to amine condensate can range from 1 to 15, or higher, but preferably 1 to 4.

When the above amine condensates are treated with alkylene oxides, the product formed will depend on many factors, for example, whether the amine employed is hydroxylated, etc. Where the amines employed are non-hydroxylated, the amine condensate is at least susceptible to oxyalkylation through the phenolic hydroxyl radical. Although the polyamine is non-hydroxylated, it may have one or more primary or secondary amino groups which may be oxyalkylated, for example, in the case of tetraethylene pentamine. Such groups may or may not be susceptible to oxyalkylation for reasons which are obscure. Where the non-hydroxylated amine contains a plurality of secondary amino groups, wherein one or more is susceptible to oxyalkylation, or primary amino groups, oxyalkylation may occur in those positions. Thus, in the case of the non-hydroxylated polyamines oxyalkylation may take place not only at the phenolic hydroxyl group but also at one or more of the available amino groups. Where the amine condensate is hydroxyalkylated, this latter group furnishes an additional position of oxyalkylation susceptibility.

The product formed in acylation will vary with the particular polyaminomethyl phenol employed. It may be an ester or an amide depending on the available reactive groups. If, however, after forming the amide at a temperature between 140°–250° C., but usually not above 200° C., one heats such products at a higher range, approximately 250–280° C., or higher, possibly up to 300° C. for a suitable period of time, for example, 1–2 hours or longer, one can in many cases recover a second mole of water for each mole of carboxylic acid employed, the first mole of water being evolved during amidification. The product formed in such cases is believed to contain a cyclic amidine ring such as an imidazoline or a tetrahydropyrimidine ring.

Ordinarily the methods employed for the production of amino imidazolines result in the formation of substantial amounts of other products such as amido imidazolines. However, certain procedures are well known by which the yield of amino imidazolines is comparatively high as, for example, by the use of a polyamine in which one of the terminal hydrogen atoms has been replaced by a low molal alkyl group or an hydroxyalkyl group, and by the use of salts in which the polyamine has been converted into a monosalt such as combination with hydrochloric acid or paratoluene sulfonic acid. Other procedures involve reaction with a hydroxyalkyl ethylene diamine and further treatment of such imidazoline having a hydroxyalkyl substituent with two or more moles of ethylene imine. Other well known procedures may be employed to give comparatively high yields.

Other very useful derivatives comprise acid salts and quaternary salts, derived therefrom. Since the compositions contain basic nitrogen groups, they are capable of reacting with inorganic acids, for example hydrohalogens (HCl, HBr, HI), sulfuric acid, phosphoric acid, etc., aliphatic acids (acetic, propionic, glycolic, diglycolic, etc.), aromatic acids (benzoic, salicylic, phthalic, etc.), and organic compounds capable of forming salts, for example, those having the general formula RX wherein R is an organic group, such as an alkyl group (e.g., methyl, ethyl, propyl, butyl, octyl, nonyl, decyl, undecyl, dodecyl, tridecyl, pentadecyl, oleyl, octadecyl, etc.), cycloalkyl (e.g., cyclopentyl, cyclohexyl, etc.), aralkyl (e.g., benzyl, etc.), aralkyl (e.g., benzyl, etc.), and the like, and X is a radical capable of forming a salt such as those derived from acids (e.g., halide, sulfate, phosphate, sulfonate, etc., radicals). The preparation of these salts and quarternary compounds is well known to the chemical art. For example, they may be prepared by adding suitable acids (for example, any of those mentioned herein as acylating agents) to solutions of the basic composition or by heating such compounds as alkyl halides with these compositions. Diacid and quaternary salts can also be formed by reacting alkylene dihalides, polyacids, etc. The number of moles of acid and quaternary compounds that may react with the composition of this invention will, of course, depend on the nuumber of basic nitrogen groups in the molecule. These salts may be represented by the general formula N$^+$X$^-$, wherein N comprises the part of the compound containing the nitrogen group which has been rendered positively charged by the H or R of the alkylating compound and X represents the anion derived from the alkylating compound.

THE METHYLOL PHENOL

As previously stated, the methylol phenols include monophenols and diphenols. The methylol groups on the phenol are either in one or two ortho positions or in the para position of the phenolic rings. The remaining phenolic ring positions are either unsubstituted or substituted with groups not interfering with the amine methylol condensation. Thus, the monophenols have 1, 2 or 3 methylol groups and the diphenols contain 1, 2, 3 or 4 methylol groups.

The following is the monophenol most advantageously employed:

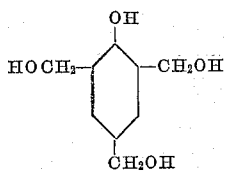

This compound, 2,4,6 trimethylol phenol (TMP) is available commercially in 70% aqueous solutions. The designation TMP is sometimes used to designate trimethylol propane. Apparently no confusion is involved, in light of the obvious differences.

A second monophenol which can be advantageously employed is:

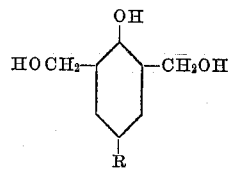

where R is an aliphatic saturated or unsaturated hydrocarbon having, for example, 1–30 carbon atoms, for example, methyl, ethyl, propyl, butyl, sec-butyl, tert-butyl, amyl, tert-amyl, hexyl, tert-hexyl, octyl, nonyl, decyl, dodecyl, octo-decyl, etc., the corresponding unsaturated groups, etc.

The third monophenol advantageously employed is

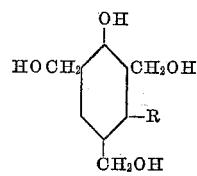

wheere R comprises an aliphatic saturated or unsaturated hydrocarbon as stated above in the second monophenol, for example, that derived from cardanol or hydrocardanol.

The following are diphenol species advantageously employed:
One species is

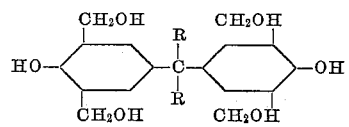

where R is hydrogen or a lower alkyl, preferably methyl.
A second series is

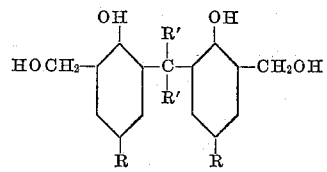

where R has the same meaning as that of the second species of the monophenols and R' is hydrogen or a lower alkyl, preferably methyl.

We can employ a wide variety of methylol phenols in the reaction, and the reaction appears to be generally applicable to the classes of phenols heretofore specified. Examples of suitable methylol phenols include:

Monophenols:
    2-methylol phenol
    2,6-dimethylol, 4-methyl phenol
    2,4,6-trimethylol phenol
    2,6-dimethylol, 4-cyclohexyl phenol
    2,6-dimethylol-4-phenyl phenol
    2,6-dimethylol-4-methoxyphenol
    2,6-dimethylol-4-chlorophenol
    2,6-dimethylol-3-methylphenol
    2,6-dimethylol-4-sec-butylphenol
    2,6-dimethylol,3,5-dimethyl-4-chlorophenol
    2,4,6-trimethylol,3-pentadecyl phenol
    2,4,6-trimethylol,3-pentadecadienyl phenol Diphenols:

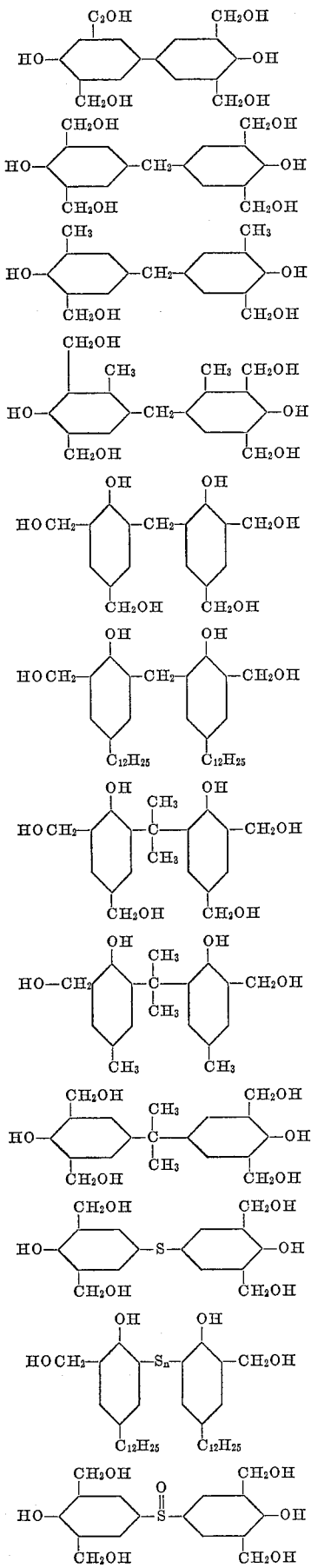

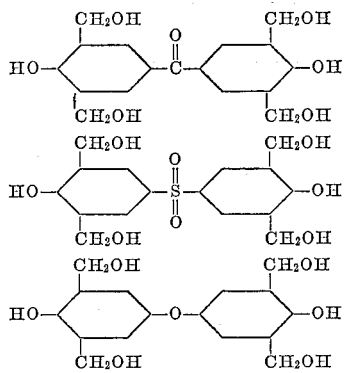

Examples of additional methylol phenols which can be employed to give the useful products of this invention are described in "The Chemistry of Phenolic Resins," by Robert W. Martin, Tables V and VI, pp. 32–39 (Wiley, 1956).

THE POLYAMINE

As noted previously, the general formula for the polyamine is

This indicates that a wide variety of reactive secondary polyamines can be employed, including aliphatic polyamines, cycloaliphatic polyamines, aromatic polyamines (provided the aromatic polyamine has at least one secondary amine which has no negative group, such as a phenyl group directly bonded thereto) heterocyclic polyamines and polyamines containing mixtures of the above groups. Thus, the term "polyamine" includes compounds having one amino group on one kind of radical, for example, an aliphatic radical, and another amino group on the heterocyclic radical as in the case of the following formula:

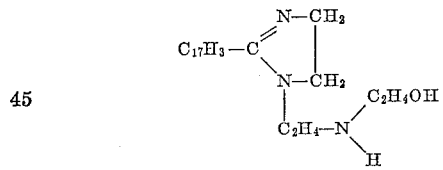

provided, of course, the polyamine has at least secondary amino group capable of condensing with the methylol group. It also includes compounds which are totally heterocyclic, having a similarly reactive secondary amino group. It also includes polyamines having other elements besides carbon, hydrogen and nitrogen, for example, those also containing oxygen, sulfur, etc. As previously stated, the preferred embodiments of the present invention are the alkylene polyamines, the hydroxylated alkylene polyamines and the amino cyclic amidines.

Polyamines are available commercially and can be prepared by well-known methods. It is well known that olefin dichlorides, particularly those containing from 2 to 10 carbon atoms, can be reacted with ammonia or amines to give alkylene polyamines. If, instead of using ethylene dichloride, the corresponding propylene, butylene, amylene or higher molecular weight dichlorides are used, one then obtains the comparable homologues. One can also use alpha-omega dialkyl ethers such as $ClCH_2OCH_2Cl$; $ClCH_2CH_2OCH_2CH_2Cl$ and the like. Such polyamines can be alkylated in the manner commonly employed for alkylating monoamines. Such alkylation results in products which are symmetrically or non-symmetrically alkylated. The symmetrically alkylated polyamines are most readily obtainable. For instance, alkylated products can be derived by reaction between alkyl chlorides, such as propyl chloride, butyl chloride, amyl chloride, cetyl chloride, and the like and a polyamine having one or more primary amino groups. Such reactions result in the formation of hydrochloric acid, and hence the resultant product is an amine hydrochloride. The conventional method for conversion into the base is to treat with dilute caustic solution. Alkylation is not limited to the introduction of an alkyl group, but as a matter of fact, the radical introduced can be characterized by a carbon atom chain interrupted at least once by an oxygen atom. In other words, alkylation is accomplished by compounds which are essentially alkyoxyalkyl chlorides, as, for example, the following:

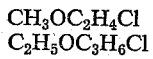  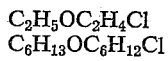

The reaction involving the alkylene dichlorides is not limited to ammonia, but also involves amines, such as ethylamine, propylamine, butylamine, octylamine, decylamine, cetylamine, dodecylamine, etc. Cycloaliphatic and aromatic amines are also reactive. Similarly, the reaction also involves the comparable secondary amines, in which various alkyl radicals previously mentioned appear twice and are types in which two dissimilar radicals appear, for instance, amyl butylamine, hexyl octylamine, etc. Furthermore, compounds derived by reactions involving alkylene dichlorides and a mixture of ammonia and amines, or a mixture of two different amines are useful. However, one need not employ a polyamine having an alkyl radical. For instance, any suitable polyalkylene polyamine, such as an ethylene polyamine, a propylene polyamine, etc., treated with ethylene oxide or similar oxyalkylating agent are useful. Furthermore, various hydroxylated amines, such as monoethanolamine, monopropanolamine, and the like, are also treated with a suitable alkylene dichloride, such as ethylene dichloride, propylene dichloride, etc.

As to the introduction of a hydroxylated group, one can use any one of a number of well-known procedures such as alkylation, involving a chlorhydrin, such as ethylene chlorhydrin, glycerol chlorhydrin, or the like. Such reactions are entirely comparable to the alkylation reaction involving alkyl chlorides previously described. Other reactions involve the use of an alkylene oxide, such as ethylene oxide, propylene oxide, butylene oxide, octylene oxide, styrene oxide or the like. Glycide is advantageously employed. The type of reaction just referred to is well known and results in the introduction of a hydroxylated or polyhydroxylated radical in an amino hydrogen position. It is also possible to introduce a hydroxylated oxyhydrocarbon atom; for instance, instead of using the chlorhydrin corresponding to ethylene glycol, one employs the chlorhydrin corresponding to diethylene glycol. Similarly, instead of using the chlorhydrin corresponding to glycerol, one employs the chlorhydrin corresponding to diglycerol.

From the above description it can be seen that many of the above polyamines can be characterized by the general formula

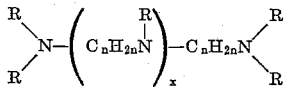

where the Rs', which are the same or different, comprise hydrogen, alkyl, cycloalkyl, aryl, alkyloxyalkyl, hydroxylated alkyl hydroxylated alkyloxyalkyl, etc., radicals, $x$ is zero or a whole number of at least one, for example 1 to 10, but preferably 1 to 3, provided the polyamine contains at least one secondary amino group, and $n$ is a whole number, 2 or greater, for example 2–10, but preferably 2–5. Of course, it should be realized that the amino or hydroxyl group may be modified by acylation to form amides, esters or mixtures thereof, prior to the methylol-amino condensation provided at least one active secondary amine group remains on the molecule. Any of the suitable acylating agents herein described may be employed in this acylation. Prior acylation of the amine can advantageously be used instead of acylation subsequent to amine condensation.

A particularly useful class of polyamines is a class of branched polyamines. These branched polyamines are polyalkylene polyamines wherein the branched group is a side chain containing on the average at least one nitrogen-bonded aminoalkylene

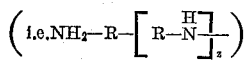

group per nine amino units present on the main chain, for example 1–4 of such branched chains per nine units on the main chain, but preferably one side chain unit per nine main chain units. Thus, these polyamines contain at least three primary amino groups and at least one tertiary amino group in addition to at least one secondary amino group.

These branched polyamines may be expressed by the formula

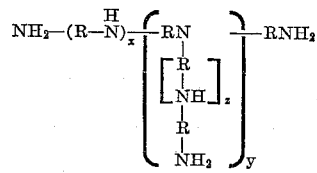

wherein R is an alkylene group such as ethylene, propylene, butylene and other homologues (both straight chained and branched), etc., but preferably ethylene; and $x$, $y$ and $z$ are integers, $x$ being for example, from 4 to 24 or more but preferably 6 to 18, $y$ being for example 1 to 6 or more but preferably 1 to 3, and $z$ being for example 0–6 but preferably 0–1. The $x$ and $y$ units may be sequential, alternative, orderly or randomly distributed.

The preferred class of branched polyamines includes those of the formula

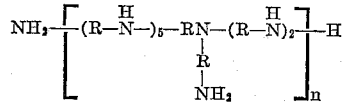

where $n$ is an integer, for example 1–20 or more but preferably 1–3, wherein R is preferably ethylene, but may be propylene, butylene, etc. (straight chained or branched).

The particularly preferred branched polymines are presented by the following formula:

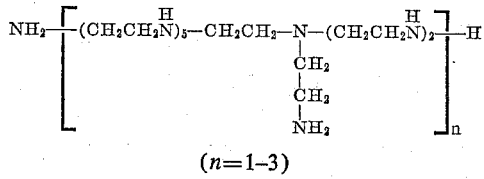

$(n=1-3)$

The radicals in the brackets may be joined in a head-to-head or a head-to-tail fashion. Compounds described by this formula wherein $n=1-3$ are manufactured and sold by Dow Chemical Company as Polyamines N–400, N–800, N–1200, etc. Polyamine N–400 has the above formula $n=1$ and was the branched polyamine employed in all of the specific examples.

The branched polyamines can be prepared by a wide variety of methods. One method comprises the reaction of ethanolamine and ammonia under pressure over a fixed bed of a metal hydrogenation catalyst. By controlling the conditions of this reaction one can obtain various amounts of piperazine and polyamines as well as branched chain polyalkylene polyamine. This process is described in Australian Patent No. 42,189, and in the East German Patent 14,480 (March 17, 1958) reported in Chem. Abstracts, August 10, 1958, 14129.

The branched polyamines can also be prepared by the following reactions:

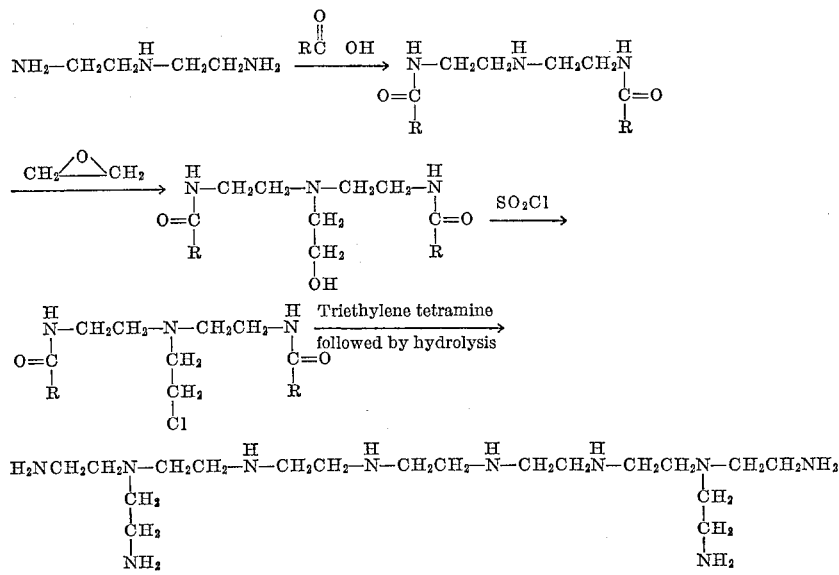

Variations on the above procedure can produce other branched polyamines.

The branched nature of the polyamine imparts unusual properties to the polyamine and its derivatives. Cyclic aliphatic polyamines having at least one secondary amino group such as piperazine, etc., can also be employed.

It should be understood that diamines containing a secondary amino group may be employed. Thus, where $x$ in the linear polyalkylene amine is equal to zero, at least one of the R's would have to be hydrogen, for example, a compound of the following formula:

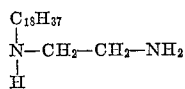

Suitable polyamines also include polyamines wherein the alkylene group or groups are interrupted by an oxygen radical, for example,

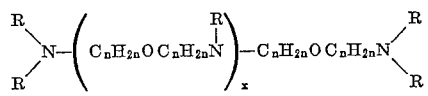

or mixtures of these groups and alkylene groups, for example,

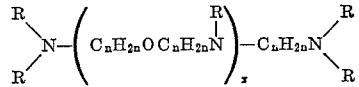

where R, $n$ and $x$ has the meaning previously stated for the linear polyamine.

For convenience the aliphatic polyamines have been classified an nonhydroxylated and hydroxylated alkylene polyamino amines. The following are representative members of the nonhydroxylated series:

Diethylene triamine,
Dipropylene triamine,
Dibutylene triamine, etc.,
Triethylene tetramine,
Tripropylene tetramine,
Tributylene tetramine, etc.,
Tetraethylene pentamine,
Tetrapropylene pentamine,
Tetrabutylene pentamine, etc.,
Mixtures of the above,
Mixed ethylene, propylene, and/or butylene, etc., polyamines and other members of the series.

The above polyamines modified with higher molecular weight aliphatic groups, for example, those having from 8–30 or more carbon atoms, a typical example of which is

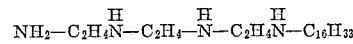

where the aliphatic group is derived from any suitable source, for example, from compounds of animal or vegetable origin, such as coconut oil, tallow, tall oil, soya, etc., are very useful. In addition, the polyamine can contain other alkylene groups, fewer amino groups, additional higher aliphatic groups, etc., provided the polyamine has at least one reactive secondary amino group. Compositions of this type are described in U.S. Patent 2,267,205.

Other useful aliphatic polyamines are those containing substituted groups on the chain, for example, aromatic groups, heterocyclic groups, etc., such as a compound of the formula

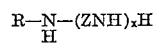

where R is alkyl and Z is an alkylene group containing phenyl groups on some of the alkylene radicals since the phenyl group is not attached directly to the secondary amino group.

In addition, the alkylene group substituted with a hydroxy group

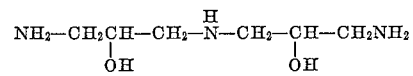

is reactive.

Polyamines containing aromatic groups in the main part of the chain are useful, for example, N,N'-dimethyl-p-xylylenediamine.

Examples of polyamines containing solely secondary amino groups include the following:

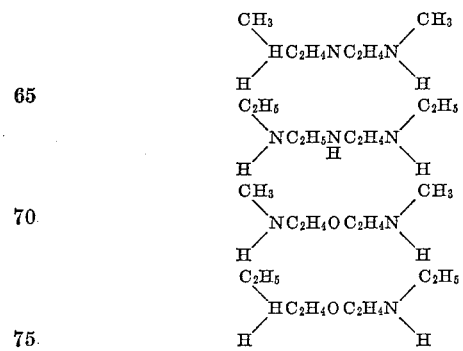

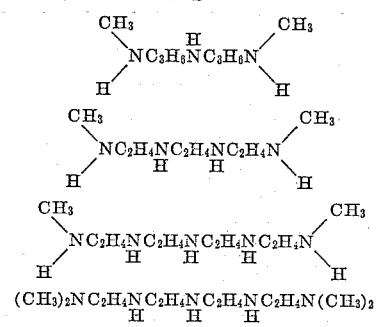

Examples of polyamines having hydroxylated groups include the following:

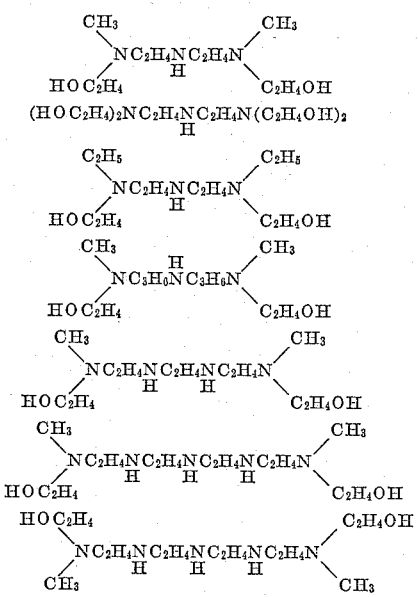

Suitable cyclic amidines include

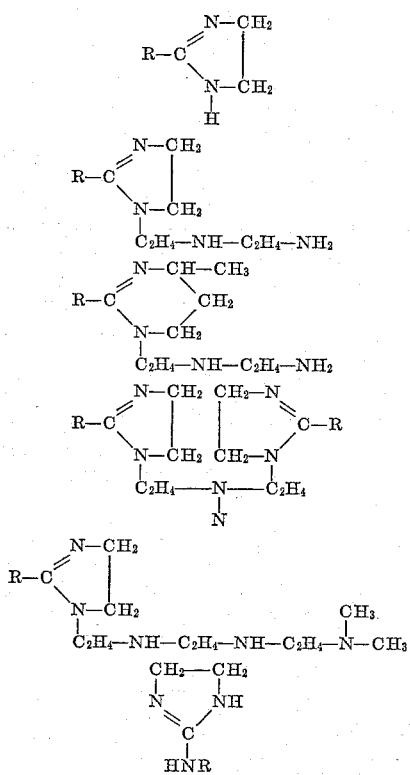

wherein R is a hydrocarbon group,

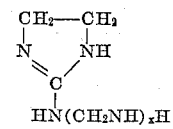

where $x = 1$–$5$.

2-undecylimidazoline
2-heptadecylimidazoline
2-oleylimidazoline
1-N-decylaminoethyl,2-ethylimidazoline
2-methyl, 1-hexadecylaminoethylaminoethylimidazoline
1-dodecylaminopropylimidazoline
1-(stearoyloxyethyl) aminoethylimidazoline
1-stearamidoethylaminoethylimidazoline
2-heptadecyl,4,5-dimethylimidazoline
1-dodecylaminohexylimidazoline
1-stearoyloxyethylaminohexylimidazoline
2-heptadecyl,1-methylaminoethyl tetrahydropyrimidine
4-methyl,2-dodecyl,1-methylaminoethylaminoethyl tetrahydropyrimidine

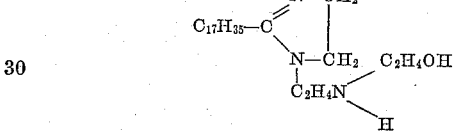

As previously stated, there must be reacted at least one mole of polyamine per equivalent of methylol group. The upper limit to the amount of amine present will be determined by convenience and economics, for example, 1 or more moles of polyamine per equivalent of methylol group can be employed.

The following examples are illustrative of the preparation of the polyaminomethylol phenol condensate and are not intended for purposes of limitation.

The following general procedure is employed in preparing the polyamine-methylol condensate. The methylolphenol is generally mixed or slowly added to the polyamine in ratios of 1 mole of polyamine per equivalent of methylol group on the phenol. However, where the polyamine is added to the methylolphenol, addition is carried out below 60° C. until at least one mole of polyamine per methylol group has been added. Enough of a suitable azeotroping agent is then added to remove water (benzene, toluene, or xylene) and heat applied. After removal of the calculated amount of water from the reaction mixture (one mole of water per equivalent of methylol group) heating is stopped and the azeotroping agent is evaporated off under vacuum. Although the reaction takes place at room temperature, higher temperatures are required to complete the reaction. Thus, the temperature during the reaction generally varies from 80–160° C. and the time from 4–24 hours. In general, the reaction can be effected in the lower time range employing higher temperatures. However, the time test of completion of reaction is the amount of water removed.

*Example 1a*

This example illustrates the reaction of a methylolmonophenol and a polyamine. A liter flask is employed with a conventional stirring device, thermometer, phase separating trap, condenser, heating mantle, etc. 70% aqueous 2,4,6-trimethylol phenol which can be prepared by conventional procedures or purchased in the open market, in this instance, the latter, is employed. The amount used is one gram mole, i.e., 182 grams, of anhydrous trimethylol phenol in 82 grams of water. This represents three equivalents of methylol groups. This solution is added dropwise with stirring to three gram moles (309 grams) of diethylene triamine dissolved in 100 ml. of xylene over about 30 minutes. An exothermic reaction takes place at this point but the temperature is maintained below approximately 60° C. The temperature is then raised so that distillation takes place with the removal of the predetermined amount of water, i.e., the water of solution as well as water of reaction. The water of reaction represents 3 gram moles or 54 grams.

The entire procedure including the initial addition of the trimethylol phenol until the end of the reaction is approximately 6 hours. At the end of the reaction period the xylene is removed, using a vacuum of approximately 80 mm. The resulting product is a viscous water-soluble liquid of a dark red color.

*Example 28a*

This example illustrates the reaction of a methylol-monophenol and a branched polyamine. A one liter flask is employed equipped with a conventional stirring device, thermometer, phase separating trap, condenser, heating mantle, etc. Polyamine N–400, 200 grams (0.50 mole), is placed in the flask and mixed with 150 grams of xylene. To this stirred mixture is added dropwise over a period of 15 minutes 44.0 grams (0.17 mole) of a 70% aqueous solution of 2,4,6-trimethylol phenol. There is no apparent temperature change. The reaction mixture is then heated to 140° C., refluxed 45 minutes, and 24 milliliters of water is collected (the calculated amount of water is 22 milliliters). The product is a dark brown liquid (as a 68% xylene solution).

*Example 2d*

This example illustrates the reaction of a methylol diphenol.
One mole of substantially water-free

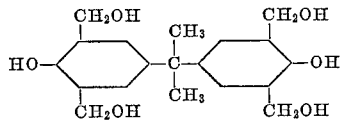

and 4 moles of triethylenetetramine in 300 ml. of xylene are mixed with stirring. Although an exothermic reaction takes place during the mixing, the temperature is maintained below 60° C. The reaction mixture is then heated and azeotroped until the calculated amount (72 g.) of water is removed (4 moles of water of reaction). The maximum temperature is 150° C. and the total reaction time is 8 hours. Xylene is then removed under vacuum. The product is a viscous water-soluble liquid.

*Example 5b*

In this example, 1 mole of substantially water-free

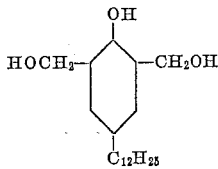

is reacted with 2 moles of Duomeen S (Armour Co.),

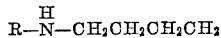

where R is a fatty group derived from soya oil, in the manner of Example 2a. Xylene is used as both solvent and azeotroping agent. The reaction time is 8 hours and the maximum temperature 150–160° C.

*Example 28b*

This experiment is carried out in the same equipment as is employed in Example 28a except that a 300 milliliter flask is used. Into the flask is placed 50 grams of xylene and 8.4 grams (0.05 mole) of 2,6-dimethylol-4-methylphenol are added. The resulting slurry is stirred and warmed up to 80° C. Polyamine N–400, 40.0 grams (0.10 mole) is added slowly over a period of 45 minutes. Solution takes place upon the addition of the polyamine. The reaction mixture is refluxed for about 4 hours at 140° C. and 1.8 milliliters of water is collected, the calculated amount. The product, as a xylene solution, is a brown liquid.

*Example 29b*

This experiment is carried out in the same equipment and in the same manner as is employed in Example 28b. To a slurry of 10.5 grams (0.05 mole) of 2,6-dimethylol-4-tertiarybutylphenol in 50 grams of xylene, 40 grams (0.10 mole) of Polyamine N–400 are added all at once with stirring and the mixture is heated and refluxed at 140° C. for 4 hours with the collection of 1.6 milliliters of water. The calculated amount of water is 1.8 milliliters. The product, as a xylene solution, is reddish brown.

*Example 30b*

This experiment is carried out in the same equipment and in the same manner as is employed in Example 28b. To a slurry of 14.0 grams of 2,6-dimethylol-4-nonylphenol in 50 milliliters of benzene, 40.0 grams (0.10 mole) of Polyamine N–400 are added all at once with stirring and the mixture is heated and refluxed at 140° C. for 6 hours with the collection of 1.8 milliliters of water. The calculated amount of water is 1.8 milliliters. The product, as a xylene solution, is dark brown.

The following amino-methylol condensates shown in Tables I–IV are prepared in the manner of Examples 1a, 2d, and 5b. In each case one mole of polyamine per equivalent of methylol group on the phenol is reacted and the reaction carried out until, taking into consideration the water originally present, about one mole of water is removed for each equivalent of methylol group present on the phenol.

The pH of the reaction mixture is determined solely by the reactants (i.e., no inorganic base, such as Ca(OH)$_2$, NaOH, etc. or other extraneous catalyst is present). Examples 1a, 2d, and 5b are also shown in the tables. Attempts are made in the examples to employ commercially available materials where possible.

In the following tables the examples will be numbered by a method which will describe the nature of the product. The polyamine-methylol condensate will have a basic number, for example, 1a, 4b, 6c, 4d, wherein those in the A series are derived from TMP, the B series from DMP, the C series from trimethylol cardanol and side chain hydrogenated cardanol (i.e., hydrocardanol), and the d series from the tetramethylol diphenols. The basic number always refers to the same amino condensate. The symbol A before the basic number indicates that the polyamine had been acylated prior to condensation. The symbol A after the basic number indicates that acylation takes place after condensation.

A25a means that the 25a (amino condensate) was prepared from an amine which had been acylated prior to condensation. However, 10aA means that the condensate was acylated after condensation. The symbol O indicates oxyalkylation. Thus 10aAO indicates that the amine condensate 10a has been acylated (10aA), followed by oxyalkylation. 10aAOA means that the same condensate, 10a, has been acylated (10aA), then oxyalkylated (10aAO) and then acylated. In other words, these symbols indicate both kind and order of treatment.

TABLE I

Reaction of

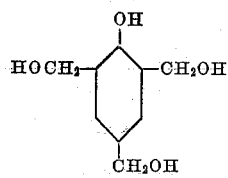

(designated TMP) and polyamines.

[Molar ratio TMP to amine 1:3]

| Example | Polyamine |
|---|---|
| 1a | Diethylene triamine. |
| 2a | Triethylene tetramine. |
| 3a | Tetraethylene pentamine. |
| 4a | Dipropylene triamine. |
| 5a | Duomeen S (Armour Co.) R—$\overset{H}{N}$—CH$_2$CH$_2$CH$_2$NH$_2$ (R derived from soya oil) |
| 6a | Duomeen T (Armour Co.) R—$\overset{H}{N}$—CH$_2$CH$_2$CH$_2$NH$_2$ (R derived from tallow) |
| 7a | Oxyethylated Duomeen S R—$\overset{H}{N}$—CH$_2$CH$_2$CH$_2$N$\overset{C_2H_4OH}{\underset{H}{}}$ |
| 8a | Oxyethylated Duomeen T R—$\overset{H}{N}$—CH$_2$CH$_2$CH$_2$N$\overset{C_2H_4OH}{\underset{H}{}}$ |
| 9a | Amine ODT (Monsanto) C$_{12}$H$_{25}$—$\overset{H}{N}$—C$_2$H$_4$$\overset{H}{N}$—C$_2$H$_4$NH$_2$ |
| 10a | Oxyethylated Amine ODT C$_{12}$H$_{25}$—$\overset{H}{N}$—C$_2$H$_4$$\overset{}{N}$—C$_2$H$_4$N$\overset{C_2H_4OH}{\underset{H}{}}$ |
| 11a | N-(2-hydroxyethyl)-2-methyl-1,2-propanediamine. |
| 12a | N-methyl ethylene diamine. |
| 13a | N,N'-dimethyl ethylene diamine. |
| 14a | Hydroxyethyl ethylene diamine. |
| 15a | N,N'-dihydroxyethylethylene diamine. |
| 16a | N-methyl propylene diamine. |
| 17a | N,N'-dihydroxyethyl propylene diamine. |
| 18a | N,N'-dihydroxypropyl propylene diamine. |
| 19a | HOC$_2$H$_4$—NC$_2$H$_4$O—C$_2$H$_4$O—C$_2$H$_4$N(C$_2$H$_4$OH)(H) |
| 20a | C$_{17}$H$_{33}$C(=N—CH$_2$)(N(H)—CH$_2$) (imidazoline) |
| 21a | CH$_3$C(=N—CH$_2$)(N—CH$_2$)—C$_2$H$_4$—N(H)—C$_2$H$_4$N—C$_{16}$H$_{33}$ |
| 22a | C$_{17}$H$_{35}$—C(=N—CH$_2$)(N—CH$_2$)—C$_2$H$_4$N(CH$_3$)(H) |
| 23a | C$_{17}$H$_{35}$—C(=N—CH$_2$)(N—CH$_2$)—C$_2$H$_4$N(C$_2$H$_4$OH)(H) |

TABLE I—Continued

| Example | Polyamine |
|---|---|
| 24a | C$_4$H$_9$C(=N—CH$_2$)(N(H)—CH$_2$) |
| A25a | Oleic acid prior acylated triethylene tetramine (1:1 molar ratio). |
| A26a | Stearic acid prior acylated tetraethylene pentamine (1:1 molar ratio). |
| A27a | Lauric acid prior acylated tetraethylene pentamine (1:1 molar ratio). |
| 28a | Polyamine N-400. |

The products formed in the above Table I are dark, viscous liquids.

TABLE II

Reaction of [benzene ring with OH, HOCH$_2$—, —CH$_2$OH, and R substituents]

(designated DMP) with polyamines.

[Molar ratio DMP/amine 1:2]

| Example | R | Polyamine |
|---|---|---|
| 1b | Dodecyl | Diethylene triamine. |
| 2b | Octadecyl | Triethylene tetramine. |
| 3b | Sec-butyl | Tetraethylene pentamine. |
| 4b | Dodecyl | Dipropylene triamine. |
| 5b | do | Duomeen S (Armour Co.) R—$\overset{H}{N}$—CH$_2$CH$_2$CH$_2$NH$_2$ (R derived from soya oil) |
| 6b | Octadecyl | Duomeen T (Armour Co.) R—$\overset{H}{N}$—CH$_2$CH$_2$CH$_2$NH$_2$ (R derived from tallow) |
| 7b | Mixed sec and tertbutyl | Oxyethylated Duomeen S R—$\overset{H}{N}$—CH$_2$CH$_2$CH$_2$N$\overset{C_2H_4OH}{\underset{H}{}}$ |
| 8b | Dodecyl | Oxyethylated Duomeen T R—$\overset{H}{N}$—CH$_2$CH$_2$CH$_2$N$\overset{C_2H_4}{\underset{H}{}}$ |
| 9b | Tert-butyl | Amine ODT (Monsanto) C$_{12}$H$_{25}$—N—C$_2$H$_4$$\overset{H}{N}$—C$_2$H$_4$NH$_2$ |
| 10b | do | Oxyethylated amine ODT C$_{12}$H$_{25}$—$\overset{H}{N}$—C$_2$H$_4$$\overset{}{N}$—C$_2$H$_4$N$\overset{C_2H_4OH}{\underset{H}{}}$ |
| 11b | Octadecyl | N-(2-hydroxyethyl)-2-methyl-1,2 propanediamine. |
| 12b | Dodecyl | N-methyl ethylene diamine. |
| 13b | do | N,N'-dimethyl ethylene diamine. |
| 14b | do | Hydroxyethyl ethylene diamine. |
| 15b | do | N,N'-dihydroxyethylethylene diamine. |
| 16b | do | N-methyl propylene diamine. |
| 17b | Octadecyl | N,N'-dihydroxyethyl propylene diamine. |
| 18b | do | N,N'-dihydroxypropyl propylene diamine. |
| 19b | Tert butyl | HOC$_2$H$_4$—NC$_2$H$_4$O—C$_2$H$_4$O—C$_2$H$_4$—N(C$_2$H$_4$OH)(H) |
| 20b | do | C$_{17}$H$_{33}$C(=N—CH$_2$)(N(H)—CH$_2$) |

TABLE II—Continued

| Example | R | Polyamine |
|---|---|---|
| 21b | Tert butyl | $CH_3C\begin{smallmatrix}N-CH_2\\ \\N-CH_2\end{smallmatrix}$ $C_2H_4-\underset{H}{N}-C_2H_4\underset{H}{N}-C_{16}H_{33}$ |
| 22b | ----do---- | $C_{17}H_{35}-C\begin{smallmatrix}N-CH_2\\ \\N-CH_2\end{smallmatrix}CH_2$ $C_2H_4\underset{H}{N}\diagdown\begin{smallmatrix}CH_3\end{smallmatrix}$ |
| 23b | ----do---- | $C_{17}H_{35}-C\begin{smallmatrix}N-CH_2\\ \\N-CH_2\end{smallmatrix}CH_2$ $C_2H_4\underset{H}{N}\diagdown\begin{smallmatrix}C_2H_4OH\end{smallmatrix}$ |
| 24b | Dodecyl | $C_4H_9C\begin{smallmatrix}N-CH_2\\ \\N-CH_2\end{smallmatrix}$ |
| A25b | ----do---- | Oleic acid prior acylated triethylene tetramine (1:1 molar ratio). |
| A26b | ----do---- | Stearic acid prior acylated tetraethylene pentamine (1:1 molar ratio). |
| A27b | ----do---- | Lauric acid prior acylated tetraethylene pentamine (1:1 molar ratio). |
| 28b | Methyl | Polyamine N-400. |
| 29b | Tert butyl | Do. |
| 30b | Nonyl | Do. |

The products formed in the above Table II are dark viscous liquids.

TABLE III

Reaction of

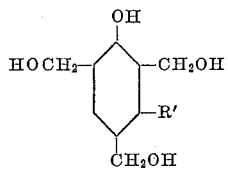

(trimethylol cardanol and side chain hydrogenated cardanol) with polyamines.

[Molar ratio of the trimethylol cardanol to amine 1:3]

| Example | R' Derived from— | Polyamine |
|---|---|---|
| 1c | Cardanol | Diethylene triamine. |
| 2c | ----do---- | Triethylene tetramine. |
| 3c | Hydrogenated Cardanol. | Tetraethylene pentamine. |
| 4c | ----do---- | Dipropylene triamine. |
| 5c | ----do---- | Duomeen S (Armour Co.) $R-\underset{H}{N}-CH_2CH_2CH_2NH_2$ (R derived from soya oil) |
| 6c | ----do---- | Duomeen T (Armour Co.) $R-\underset{H}{N}-CH_2CH_2CH_2NH_2$ (R derived from tallow) |
| 7c | Cardanol | Oxyethylated Duomeen S $R-\underset{H}{N}-CH_2CH_2CH_2N\diagdown\begin{smallmatrix}C_2H_4OH\\H\end{smallmatrix}$ |
| 8c | Hydrogenated Cardanol. | Oxyethylated Duomeen T $R-\underset{H}{N}-CH_2CH_2CH_2N\diagdown\begin{smallmatrix}C_2H_4OH\\H\end{smallmatrix}$ |
| 9c | Cardanol | Amine ODT (Monsanto) $C_{12}H_{25}-\underset{H}{N}-C_2H_4\underset{H}{N}-C_2H_4NH_2$ |
| 10c | Hydrogenated Cardanol. | Oxyethylated Amine ODT $C_{12}H_{25}-\underset{H}{N}-C_2H_4\underset{H}{N}-C_2H_4N\diagdown\begin{smallmatrix}C_2H_4OH\\H\end{smallmatrix}$ |
| 11c | Cardanol | N-(2-hydroxyethyl)-2-methy-1,2-propanediamine. |
| 12c | Hydrogenated Cardanol. | N-methyl ethylene diamine. |

The products formed in the above Table III are dark, viscous liquids.

TABLE IV

Reaction of

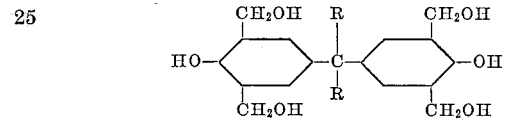

[Molar ratio of tetramethylol diphenol to polyamine 1:4]

| Example | R | Polyamine |
|---|---|---|
| 1d | Hydrogen | Diethylene triamine. |
| 2d | ----do---- | Triethylene tetramine. |
| 3d | ----do---- | Tetraethylene pentamine. |
| 4d | ----do---- | Dipropylene triamine. |
| 5d | ----do---- | Duomeen S (Armour Co.) $R-\underset{H}{N}-CH_2CH_2CH_2NH_2$ (R derived from soya oil) |
| 6d | ----do---- | Duomeen T (Armour Co.) $R-\underset{H}{N}-CH_2CH_2CH_2NH_2$ (R derived from tallow) |
| 7d | ----do---- | Oxyethylated Duomeen S $R-\underset{H}{N}-CH_2CH_2CH_2N\diagdown\begin{smallmatrix}C_2H_4OH\\H\end{smallmatrix}$ |
| 8d | ----do---- | Oxyethylated Duomeen T $R-\underset{H}{N}-CH_2CH_2CH_2N\diagdown\begin{smallmatrix}C_2H_4OH\\H\end{smallmatrix}$ |
| 9d | ----do---- | Amine ODT (Monsanto) $C_{12}H_{25}-\underset{H}{N}-C_2H_4\underset{H}{N}-C_2H_4NH_2$ |
| 10d | ----do---- | Oxyethylated Amine ODT $C_{12}H_{25}-\underset{H}{N}-C_2H_4\underset{H}{N}-C_2H_4N\diagdown\begin{smallmatrix}C_2H_4OH\\H\end{smallmatrix}$ |
| 11d | ----do---- | N-(2-hydroxyethyl)-2-methyl-1,2 propanediamine. |
| 12d | ----do---- | N-methyl ethylene diamine. |
| 13d | Methyl | Diethylene triamine. |
| 14d | ----do---- | Triethylene tetramine. |
| 15d | ----do---- | Tetraethylene pentamine. |
| 16d | ----do---- | Dipropylene triamine. |
| 17d | ----do---- | Duomeen S (Armour Co.) $R-\underset{H}{N}-CH_2CH_2CH_2NH_2$ (R derived from soya oil) |
| 18d | ----do---- | Duomeen T (Armour Co.) $R-\underset{H}{N}-CH_2CH_2CH_2NH_2$ (R derived from tallow) |

TABLE IV—Continued

| Example | R | Polyamine |
|---|---|---|
| 19d | Methyl | Oxyethylated Duomeen S $$R-N-CH_2CH_2CH_2N\begin{matrix}H\\\\\\H\end{matrix}\begin{matrix}C_2H_4OH\\\\\\H\end{matrix}$$ |
| 20d | ----do---- | Oxyethylated Duomeen T $$R-N-CH_2CH_2CH_2N\begin{matrix}H\\\\\\H\end{matrix}\begin{matrix}C_2H_4OH\\\\\\H\end{matrix}$$ |
| 21d | ----do---- | Amine ODT (Monsanto) $$C_{12}H_{25}-N-C_2H_4N-C_2H_4HN_2\\\\H$$ |
| 22d | ----do---- | Oxyethylated Amine ODT $$C_{12}H_{25}-N-C_2H_4N-C_2H_4N\begin{matrix}H\\\\\\H\end{matrix}\begin{matrix}C_2H_4OH\\\\\\H\end{matrix}$$ |
| 23d | ----do---- | N-(2-hydroxyethyl)-2-methyl-1,2-propanediamine. |
| 24d | ----do---- | N-methyl ethylene diamine. |

The products formed in the above Table IV are dark, viscous liquids.

THE ACYLATING AGENT

As in the reaction between the methylol phenol and the secondary amine, acylation is also carried out under dehydrating conditions, i.e., water is removed. Any of the well-known methods of acylation can be employed. For example, heat alone, heat and reduced pressure, heat in combination with an azeotroping agent, etc., are all satisfactory.

A wide variety of acylating agents can be employed. However, strong acylating agents such as acyl halides, or acid anhydrides should be avoided since they are capable of esterifying phenolic hydroxy groups, a feature which is undesirable.

Although a wide variety of carboxylic acids produce excellent products, in our experience monocarboxy acids having more than 6 carbon atoms and less than 40 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally occurring petroleum acids, such as naphthenic acids, and carboxy acids, produced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, saturated and unsaturated, aliphatic, alicyclic, fatty, aromatic, hydroaromatic and aralkyl acids, etc.

Examples of saturated aliphatic monocarboxylic acids are acetic, propionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, angelic, tiglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodecenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petroselinic acid, oleic acid, elardic acid, the nonadecenoic acids, for example, the eicosenoic acids, the docosenoic acids, for example, erucic acid, brassidic acid, cetoleic acid, the tetracosenoic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudoeleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecenoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydrocarpic and chaulmoogric acids, cyclopentane carboxylic acids, cyclohexanecarboxylic acid, campholic acid, fencholic acids, and the like.

Examples of aromatic monocarboxylic acids are benzoic acid, substituted benzoic acids, for example, the toluic acids, the xylenic acids, alkoxy benzoic acid, phenyl benzoic acid, naphthalene carboxylic acid, and the like.

Mixed higher fatty acids derived from animal or vegetable sources, for example, lard, cocoanut oil, rape-seed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids are fumaric, maleic, mesacenic, citraconic, glutonic, itaconic, muconic, aconitic acids, and the like.

Examples of aromatic polycarboxylic acids are phthalic, isophthalic acids, terephthalic acids, substituted derivatives thereof (e.g., alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are hemimellitic, trimellitic, trimesic, mellophanic, prehnitic, pyromellitic acids, mellitic acid, and the like.

Other polycarboxylic acids are the dimeric, trimeric and polymeric acids, for example, dilinoleic trilinoleic, and other polyacids sold by Emery Industries, and the like. Other polycarboxylic acids include those containing ether groups, for example, diglycolic acid. Mixtures of the above acids can be advantageously employed.

In addition, acid precursors such as esters, glycerides, etc. can be employed in place of the free acid.

The moles of acylating agent reacted with the polyaminomethyl compound will depend on the number of acetylation reactive positions contained therein as well as the number of moles one wishes to incorporate into the molecule. We have advantageously reacted 1 to 15 moles of acylating agent per mole of polyaminophenol, but preferably 3 to 6 moles.

The following examples are illustrative of the preparation of the acylated polyaminomethyl phenol condensate.

The following general procedure is employed in acylating. The condensate is mixed with the desired ratio of acid and a suitable azeotroping agent is added. Heat is then applied. After the removal of the calculated amount of water (1 to 2 equivalents per mole of acid employed), heating is stopped and the azeotroping agent is evaporated under vacuum. The temperature during the reaction can vary from 80–200° C. (except where the formation of the cyclic amidine type structure is desired and the maximum temperature is generally 200–280° C.) The times range from 4 to 24 hours. Here again, the true test of the degree of reaction is the amount of water removed.

*Example 3aA*

In a 5 liter, 3 necked flask furnished with a stirring device, thermometer, phase separating trap, condenser and heating mantle, 697 grams of 3a (one mole of the TMP-tetraethylene pentamine reaction product) is dissolved in 600 ml. of xylene. 846 grams of oleic acid (3 moles) is added to the TMP-polyamine condensate with stirring in ten minutes. The reaction mixture was then heated gradually to about 145° in half an hour and then held at about 160° over a period of 3 hours until 54 grams (3 moles) of water is collected in the side of the tube. The solvent is then removed with gentle heating under a reduced pressure of approximately 20 mm. The product is a dark brown viscous liquid with a nitrogen content of 14.5%.

*Example 3aA'*

The prior example is repeated except that the final reaction temperature is maintained at 240° C. and 90 grams (5 moles) of water is removed instead of 54 grams. Infrared analysis of the product indicates the presence of a cyclic amidine ring.

*Example 7aA*

The reaction product of Example 7a (TMP and oxyethylated Duomeen S) is reacted with palmitic acid in the manner of Example 3aA. A xylene soluble product is formed.

The following examples of acylated polyaminomethyl phenol condensates are prepared in the manner of the above examples. The products obtained are dark viscous liquids.

*Example 28aA*

Into a 300 milliliter flask, fited with a stirring device, thermometer, phase separating trap, condenser and heating mantle, is placed a xylene solution of the product of Example 28a containing 98.0 grams (0.05 mole) of the reaction product of 2,4,6-trimethylolphenol and Polyamine N–400 and about 24 grams of xylene. To this solution is added with stirring 30.0 grams (0.15 mole) of lauric acid. The reaction mixture is heated for about one hour at a maximum reaction temperature of 190° C. and 6 milliliters of water are collected. The calculated amount of water for imidazoline formation is 5.4 milliliters. The resulting product as an 88 percent xylene solution is a dark brown thick liquid.

*Example 28bA*

Into a 300 milliliter flask, fitted with a stirring device, thermometer, phase separating trap, condenser and heating mantle is placed a xylene solution of the product of Example 28b containing 35.0 grams (0.025 mole) of the reaction product of 2,6-dimethylol-4-methylphenol and Polyamine N–400 and about 20 grams of xylene. To this solution is added with stirring 14.1 grams (0.05 mole) of oleic acid. The reaction mixture is heated at reflux for 4.5 hours at a maximum temperature of 183° C. and 1.0 milliliters of water is collected, the calculated amount of water for amide formation being 0.9 milliters. The product is a dark burgundy liquid (as 70.5% xylene solution).

*Example 29bA*

This experiment is performed in the same equipment and in the same manner as employed in Example 28bA. Into the flask is placed a xylene solution of the product of Example 29b containing 40.9 grams (0.025 mole) of the reaction product of 2,6-dimethylol-4-tertiarybutyl phenol and Polyamine N–400 and about 47 grams of xylene. To this solution is added with stirring 7.2 grams (0.05 mole) of octanoic acid. The reaction mixture is heated at reflux for 3.75 hours at a maximum temperature of 154° C. and 1.3 milliliters of water is collected. The calculated amount of water for amide formation is 0.9 milliliter. The product as a 49.82 percent xylene solution was brown.

*Example 30bA*

This experiment is performed in the same manner and in the same equipment as is employed in Example 28bA. Into the flask is placed a xylene solution of the product of Example 30b containing 39.6 grams (0.025 mole) of the reaction product of 2,6-dimethylol-4-nonylphenol and Polyamine N–400 and about 32 grams of xylene. To this solution is added with stirring 14.2 grams (0.05 mole) of stearic acid. The reaction mixture is heated at reflux for 4 hours at a maximum temperature of 160° C. and 1.0 mililliter of water is collected. The calculated amount of water for amide formation is 0.9 milliliter. The product as a 62.5% xylene solution is a brown liquid.

TABLE V.—ACYLATED PRODUCTS OF TABLE I

| Example | Acid | Grams of acid per gram-mole of condensate | Grams of water removed |
|---|---|---|---|
| 1aA | Oleic | 846 | 54 |
| 2aA | Nonanoic | 316 | 36 |
| 3aA | Oleic | 846 | 54 |
| 3aA' | ____do | 846 | 90 |
| 4aA | Stearic | 852 | 54 |
| 5aA | Lauric | 600 | 54 |
| 6aA | Myristic | 684 | 54 |
| 7aA | Palmitic | 768 | 54 |
| 8aA | Propanoic | 222 | 54 |
| 9aA | Dimeric [1] | 1,800 | 54 |
| 10aA | Oleic | 846 | 54 |
| 11aA | ____do | 846 | 54 |
| 12aA | Sunaptic acid [2] | 990 | 54 |
| 14aA | Oleic | 846 | 54 |
| 15aA | Palmitic | 1,536 | 108 |
| 16aA | Oleic | 846 | 54 |
| 17aA | ____do | 1,692 | 108 |
| 18aA | ____do | 1,692 | 108 |
| 19aA | ____do | 846 | 54 |
| 23aA | Acetic | 180 | 54 |
| 28aA | Lauric | 600 | 120 |

[1] Dilinoleic acid sold by Emery Industries. Aldo employed in examples of Tables VI, VII and VIII.
[2] Naphthenic acid sold by Sun Oil Company, average molecular weight 220-230.

TABLE VI.—ACYLATED PRODUCTS OF TABLE II

| Example | Acid | Grams of acid per gram-mole of condensate | Grams of water removed |
|---|---|---|---|
| 1bA | Stearic | 568 | 36 |
| 2bA | Oleic | 564 | 36 |
| 3bA | Lauric | 800 | 72 |
| 4bA | Acetic | 120 | 36 |
| 5bA | Myristic | 456 | 36 |
| 6bA | Palmitic | 512 | 36 |
| 7bA | Dimeric [1] | 1,200 | 36 |
| 8bA | Oleic | 564 | 36 |
| 9bA | do | 564 | 36 |
| 10bA | Sunaptic acid [2] | 660 | 36 |
| 11bA | Oleic | 564 | 36 |
| 12bA | do | 564 | 36 |
| 14bA | Palmitic | 512 | 36 |
| 15bA | Acetic | 240 | 72 |
| 16bA | Oleic | 564 | 36 |
| 17bA | do | 1,128 | 72 |
| 18bA | do | 564 | 36 |
| 19bA | do | 564 | 36 |
| 23bA | Lauric | 400 | 36 |
| 28bA | Oleic | 564 | 40 |
| 29bA | Octanoic | 288 | 52 |
| 30bA | Stearic | 569 | 40 |

[1], [2] See footnotes at bottom of Table V.

TABLE VII.—ACYLATED PRODUCTS OF TABLE III

| Example | Acid | Grams of acid used per gram-mole of condensate | Grams of water removed |
|---|---|---|---|
| 1cA | Oleic | 564 | 36 |
| 2cA | Palmitic | 512 | 36 |
| 3cA | Lauric | 800 | 72 |
| 4cA | Myristic | 456 | 36 |
| 5cA | Acetic | 120 | 36 |
| 6cA | Dimeric [1] | 1,200 | 36 |
| 7cA | Oleic | 564 | 36 |
| 8cA | do | 564 | 36 |
| 9cA | Sunaptic [2] | 660 | 36 |
| 10cA | Oleic | 564 | 36 |
| 11cA | do | 564 | 36 |
| 12cA | do | 564 | 36 |

[1], [2] See footnotes at bottom of Table V.

TABLE VIII.—ACYLATED PRODUCTS OF TABLE IV

| Example | Acid | Grams of acid used per gram-mole of condensate | Grams of water removed |
|---|---|---|---|
| 1dA | Oleic | 1,128 | 72 |
| 2dA | do | 1,128 | 72 |
| 3dA | Stearic | 2,272 | 144 |
| 4dA | Lauric | 800 | 72 |
| 5dA | Myristic | 912 | 72 |
| 6dA | Palmitic | 1,024 | 72 |
| 7dA | Oleic | 1,128 | 72 |
| 8dA | Dimeric [1] | 2,400 | 72 |
| 9dA | Sunaptic [2] | 1,320 | 72 |
| 10dA | Acetic | 240 | 72 |
| 11dA | Oleic | 1,128 | 72 |
| 12dA | do | 1,128 | 72 |
| 13dA | do | 1,128 | 72 |
| 14dA | do | 1,128 | 72 |
| 15dA | Palmitic | 2,048 | 144 |
| 16dA | Myristic | 912 | 72 |
| 17dA | Oleic | 1,128 | 72 |
| 18dA | Palmitic | 1,024 | 72 |
| 19dA | Stearic | 1,136 | 72 |
| 20dA | do | 1,136 | 72 |
| 21dA | Oleic | 1,128 | 72 |
| 22dA | do | 1,128 | 72 |
| 23dA | do | 1,128 | 72 |
| 24dA | do | 1,128 | 72 |

[1], [2] See footnotes at bottom of Table V.

Reference has been made and reference will be continued to be made herein to oxyalkylation procedures. Such procedures are concerned with the use of monoepoxides and principally those available commercially at low cost, such as ethylene oxide, propylene oxide and butylene oxide, octylene oxide, styrene oxide, etc.

Oxyalkylation is well known. For purpose of brevity reference is made to Parts 1 and 2 of U.S. Patent No. 2,792,371, dated May 14, 1957, to Dickson, in which particular attention is directed to the various patents which describe typical oxyalkylation procedure. Furthermore, manufacturers of alkylene oxides furnish extensive information as to the use of oxides. For example, see the technical bulletin entitled "Ethylene Oxide" which has been distributed by the Jefferson Chemical Company, Houston, Texas. Note also the extensive bibliography in this bulletin and the large number of patents which deal with oxyalkylation processes.

The following examples illustrate oxyalkylation.

*Example $1aAO_1$*

The reaction vessel employed is a 4 liter stainless steel autoclave equipped with the usual devices for heating and heat control, a stirrer, inlet and outlet means, etc., which are conventional in this type of apparatus. The stirrer is operated at a speed of 250 r.p.m. Into the autoclave is charged 1230 grams (1 mole) of 1aA, and 500 grams of xylene. The autoclave is sealed, swept with nitrogen, stirring started immediately, and heat applied. The temperature is allowed to rise to approximately 100° C. at which time the addition of ethylene oxide is started. Ethylene oxide is added continuously at such speed that it is absorbed by the reaction mixture as added. During the addition 132 grams (3 moles) of ethylene oxide is added over 2¼ hours at a temperature of 100° C. to 120° C. and a maximum pressure of 30 p.s.i.

*Example $1aAO_2$*

The reaction mass of Example 1AO is transferred to a larger autoclave (capacity 15 liters) similarly equipped. Without adding any more xylene the procedure is repeated so as to add another 264 grams (6 moles) of ethylene oxide under substantially the same operating conditions but requiring about 3 hours for the addition.

*Example $1aAO_3$*

In a third step, another 264 grams (6 moles) of ethylene oxide is added to the product of Example $1aAO_2$. The reaction slows up and requires approximately 6 hours, using the same operating temperatures and pressures.

*Example $1AO_4$*

At the end of the third step the autoclave is opened and 25 grams of sodium methylate is added, the autoclave is flushed out as before, and the fourth and final oxyalkylation is completed, using 1100 grams (25 moles) of ethylene oxide. The oxyalkylation is completed within 6½ hours, using the same temperature range and pressure as previously.

*Example $1aAO_5$*

The reaction vessel employed is the same as that used in Example 1aAO. Into the autoclave is charged 1230 g. (1 mole) of 1aA and 500 grams of xylene. The autoclave is sealed, swept with nitrogen, stirring is started immediately, and heat is applied. The temperature is allowed to rise to approximately 100° C. at which time the addition of propylene oxide is started. Propylene oxide is added continuously at such speed that it is absorbed by the reaction mixture as added. During the addition 174 g. (3 moles) of propylene oxide are added over 2½ hours at a temperature of 100 to 120° C. and a maximum pressure of 30 lbs. p.s.i.

*Example $1aAO_6$*

The reaction mass of Example $1aAO_5$ is transferred to a larger autoclave (capacity 15 liters). The procedure is repeated so as to add another 174 g. (3 moles) of propylene oxide under substantially the same operating conditions but requiring about 3 hours for the addition.

*Example $1aAO_7$*

At the end of the second step (Example $1aAO_2$) the autoclave is opened, 25 g. of sodium methylate is added, and the autoclave is flushed out as before. Oxyalkylation is continued as before until another 522 g. (9 moles) of propylene oxide are added. 8 hours are required to complete the reaction.

The following examples of oxyalkylation are carried out in the manner of the examples described above. A catalyst is used in the case of oxyethylation after the initial 15 moles of ethylene oxide are added, while in the case of oxypropylation, the catalyst is used after the initial 6 moles of oxide are added. In the case of oxybutylation, oxyoctylation, oxystyrenation, etc. the catalyst is added at the beginning of the operation. In all cases the amount of catalyst is about 1½ percent of the total reactant present. The oxides are added in the order given reading from left to right. The results are presented in the following tables:

TABLE IX.—THE OXYALKYLATED PRODUCTS OF TABLE I

| Example | Grams of oxide added per gram-mole of condensate | | | | |
|---|---|---|---|---|---|
| | EtO | PrO | BuO | Octylene oxide | Styrene oxide |
| 1aO | 132 | 348 | | | |
| 2aO | 132 | 870 | | | |
| 3aO | | | 288 | | |
| 4aO | | 174 | | | |
| 5aO | 660 | | | | |
| 6aO | 440 | 174 | | | |
| 7aO | | 348 | 216 | | |
| 8aO | | 698 | 432 | | |
| 9aO | 880 | | 288 | | |
| 10aO | 1,100 | 348 | | | |
| 12aO | | | | 384 | |
| 17aO | | 1,740 | | | |
| 20aO | 264 | 1,740 | | | |
| 21aO | | | | | 390 |
| 23aO | | 1,740 | 288 | | |
| 25aO | 880 | | 432 | | |
| 28aO | 396 | 698 | | | |

TABLE X.—THE OXYALKYLATED PRODUCTS OF TABLE II

| Example | Grams of oxide added per gram-mole of condensate | | | | |
|---|---|---|---|---|---|
| | EtO | PrO | BuO | Octylene oxide | Styrene oxide |
| 1bO | 264 | | | | |
| 2bO | 396 | | | | |
| 3bO | 132 | 2,030 | | | |
| 4bO | 1,100 | | 216 | | |
| 5bO | 1,320 | | | | |
| 6bO | 1,540 | | 288 | | |
| 7bO | 1,760 | | | | |
| 8bO | 1,980 | | | | |
| 9bO | 396 | 870 | | | |
| 10bO | | 1,160 | 432 | | |
| 12bO | | | | | 130 |
| 16bO | | | | 128 | |
| 18bO | | | 288 | | |
| 21bO | | | | | 260 |
| 25bO | 660 | 1,450 | 288 | | |
| 28bO | | 1,450 | 288 | | |
| 29bO | 440 | 580 | | | |
| 30bO | | | | 128 | |

TABLE XI.—THE OXYALKYLATED PRODUCTS OF TABLE III

| Example | Grams of oxide added per gram-mole of condensate | | | | |
|---|---|---|---|---|---|
| | EtO | PrO | BuO | Octylene oxide | Styrene oxide |
| 1cO | 396 | | | | |
| 2cO | 660 | | | | |
| 3cO | 1,100 | | | | |
| 4cO | 1,320 | | | | |
| 5cO | 2,200 | | | | |
| 6cO | | 522 | | | |
| 7cO | | | | | 230 |
| 8cO | 1,320 | 870 | 216 | | |
| 9cO | 880 | 2,030 | | | |
| 10cO | 660 | | 360 | | |
| 12cO | | | | 256 | |

TABLE XII.—THE OXYALKYLATED PRODUCTS OF TABLE IV

| Example | Grams of oxide added per gram-mole of condensate | | | | |
|---|---|---|---|---|---|
| | EtO | PrO | BuO | Octylene oxide | Styrene oxide |
| 1dO | | | 432 | | |
| 2dO | | 1,450 | | | |
| 3dO | | 2,320 | | | |
| 4dO | 660 | 2,030 | | | |
| 5dO | 1,100 | 174 | | | |
| 6dO | | 1,450 | | | |
| 7dO | | | | | 420 |
| 8dO | | | | 512 | |
| 9dO | | | 720 | | |
| 10dO | 132 | 870 | | | |
| 13dO | 132 | 1,160 | | | |
| 14dO | 264 | 2,030 | | | |
| 15dO | 264 | 2,900 | | | |
| 16dO | 132 | 1,160 | 228 | | |
| 17dO | 1,100 | 698 | 228 | | |
| 18dO | 1,320 | | 720 | | |
| 19dO | | 1,740 | 432 | | |
| 20dO | | 2,320 | | | |
| 21dO | | 2,900 | 228 | | |
| 22dO | 132 | 2,030 | | | |

TABLE XIII.—THE OXYALKYLATED PRODUCTS OF TABLE V

| Example | Grams of oxide added per gram-mole of condensate | | | | |
|---|---|---|---|---|---|
| | EtO | PrO | BuO | Octylene oxide | Styrene oxide |
| 1aAO$_1$ | 132 | | | | |
| 1aAO$_2$ | | | | | 390 |
| 1aAO$_3$ | 660 | | | | |
| 1aAO$_4$ | 1,760 | | | | |
| 1aAO$_5$ | | 174 | | | |
| 1aAO$_6$ | | 348 | | | |
| 1aAO$_7$ | 396 | 522 | | | |
| 2aAO | 264 | | | | |
| 3aAO | | | | 384 | |
| 3aAO | | | | | 390 |
| 4aAO | 1,540 | | | | |
| 5aAO | 1,100 | | | | |
| 6aAO | 1,320 | | | | |
| 7aAO | 1,100 | 870 | | | |
| 8aAO | 1,100 | | 216 | | |
| 9aAO | | 1,450 | | | |
| 10aAO | | 2,030 | | | |
| 17aAO | | 1,450 | | | |
| 20aAO | 264 | 2,320 | | | |
| 23aAO | 264 | | 720 | | |
| 28aAO | 440 | 580 | | | |

TABLE XIV.—THE OXYALKYLATED PRODUCTS OF TABLE VI

| Example | Grams of oxide added per gram-mole of acylated product | | | | |
|---|---|---|---|---|---|
| | EtO | PrO | BuO | Octylene oxide | Styrene oxide |
| 1bAO | 132 | | | | |
| 2bAO | 264 | | | | |
| 3bAO | | | | 256 | |
| 3bA'O | 1,760 | | | | |
| 4bAO | | | | | 420 |
| 5bAO | 880 | 870 | | | |
| 6bAO | 880 | | 288 | | |
| 7bAO | 660 | 2,030 | | | |
| 8bAO | 660 | | 720 | | |
| 9bAO | 880 | 2,320 | | | |
| 10bAO | 880 | 1,450 | 432 | | |
| 14bAO | 1,760 | 1,450 | 216 | | |
| 28bAO | 440 | 580 | | | |
| 29bAO | | 522 | 216 | | |
| 30bAO | 440 | | 360 | | | inhibitors which prevent corrosion of the metallic well equipment and the consequent deposition of corrosion products in the formation, etc. Thus, while the process is usually termed "water flooding" the flooding medium in fact constitutes a rather complex composition containing a variety of conditioning agents. It is not uncommon to include as many as 4 or 5 different agents of various types in the flooding medium. Such use of a plurality of agents, however, adds substantially to the cost of the process and in many instances it is found that such agents interfere with one another.

Many advantages are realized with the use of our compounds in a flooding process in which the flooding medium comprises an aqueous solution of the compounds of this invention. In addition to their surface active properties, these agents have anti-corrosive and strong bactericidal action and do not precipitate alkaline-earth metal salts. Furthermore, these agents display a minimum tendency to become absorbed on solid surfaces so that when employed in aqueous flooding media, a minimum amount thereof is lost from the solution by adsorption on the matrix of the formation.

In carrying out the present process, the flooding operation is effected in the conventional manner except that the flooding medium comprises an aqueous solution of the compounds of this invention. The concentration of the latter in the flooding medium is usually about 500 parts per million or greater and in many cases may be as low as 2 parts per million, depending upon the particular compound employed, the nature of the formation being subjected to flooding, and the degree of bacteria control required. In a typical five-spot flooding operation, oil field brine containing 50 parts per million of the compound is introduced at a rate of about 450 bbls. per day into each of the four input wells under a pressure sufficient to force said solution into the formation and drive it therethrough towards the centrally local output well. The operation can be continued over long periods of time without requiring any substantial increase in the pressure to force the flooding medium through the formation, thus demonstrating that no substantial plugging of the formation occurs either by precipitation of alkaline-earth metal salts or by bacterial growth.

While the flooding media employed in accordance with the present invention comprise only water or oil field brine and one or more of the herein described agents, they may also comprise additional corrosion inhibitors, tracers, supplemental bactericides, and the like. Similarly, they may be employed in conjunction with any of the operating techniques commonly applied to water flooding processes and in conjunction with other secondary recovery methods.

Other modes of applying the principle of our invention may be employed instead of those explained, change being made as regards the methods or materials employed, provided the step or steps stated by any of the following claims, or the equivalent of such stated step or steps, be employed.

In addition the compositions of this invention can also be used in water disposal wells.

This phase of the invention provides a simple and economical method for solving some of the difficult problems heretofore encountered in disposing of unwanted water. In many oil fields large volumes of water are produced and must be disposed of where water flooding operations are not in use or where water flooding operations cannot handle the amount of produced water. Most states have laws restricting pollution of streams and/or land with produced waters and oil producers must then find some method of disposing of the waste produced salt water. In many instances therefore, the salt water is disposed of by injecting the water into permeable low-pressure strata below the fresh water level. The formation into which the water is injected is not the oil producing formation and this type of disposal is defined as salt water disposal or waste water disposal. The problems of plugging of the formation and corrosion of equipment are analogous to those encountered in the secondary recovery operation by water flooding.

The following examples are presented to illustrate the present invention.

*Example*

A brine solution of the compound of Example 13-1 in the table listed below is employed in a 5 spot flooding operation in the ratio of 50 p.p.m. in the brine. The compound is added to the brine by means of a proportioning pump so that this ratio is obtained. The solution is forced into each injection well at the rate of about 350–400 lbs. per day. The injected water is taken up by the formation at such a rate that little, if any, increase of pressure is required during the week of operation during which the compound is used, thus indicating that little, if any, plugging occurs. The oil pumped from the production well is separated and the water is returned to the storage reservoir where it is used again in a similar manner. This compound also exhibits corrosion protection. The other compounds shown in the table show similar results when employed in similar water flooding or in water disposal operations.

WATER TREATING COMPOUND

| Ex. No. | I | | Weight of oxides added to I (grams) |
|---|---|---|---|
| | Reactants (grams) | H₂O eliminated (grams) | |
| 13-1 | 1a (439)+oleic acid (846) | 54 | EtO (660). |
| 13-2 | 2a (568)+oleic acid (846) | 54 | EtO (880). |
| 13-3 | 2a (568)+oleic acid (846) | 72 | EtO (880). |
| 13-4 | 3a (679)+stearic acid (852) | 54 | EtO (1540). |
| 13-5 | 2b (662)+lauric acid (400) | 36 | EtO (1320). |
| 13-6 | 1e (645)+lauric acid (400) | 36 | EtO (1760). |
| 13-7 | 3c (907)+lauric acid (600) | 54 | EtO (1980). |
| 13-8 | 1d (660)+oleic acid (1128) | 72 | EtO (2200). |
| 13-9 | 1d (660)+lauric acid (800) | 72 | EtO (2420). |
| 13-10 | 3d (1004)+lauric acid (800) | 72 | EtO (2200). |
| 13-11 | 13d (688)+lauric acid (800) | 72 | EtO (1100). |
| 13-12 | 13d (688)+lauric acid (800) | 72 | EtO (1320). |
| 13-13 | 16d (800)+oleic acid (1128) | 72 | EtO (1100). |
| 13-14 | 16d (800)+oleic acid (1128) | 72 | EtO (1320). |
| 13-15 | 16d (800)+oleic acid (1128) | 72 | EtO (2200). |

| Ex. No. | I | | Weight of oxides added to I in alphabetical order (grams) |
|---|---|---|---|
| | Reactants (grams) | H₂O eliminated (grams) | |
| 13-16 | 28a (1960) | | (A) PrO (580). |
| 13-17 | 28a (1960)+lauric acid (600). | 120 | (A) PrO (116) (B) EtO (1320). |
| 13-18 | 28aO (3054)+stearic acid (284). | 18 | |
| 13-19 | 28aAOA | | |
| 13-20 | 28b (1400) | | EtO (1980). |
| 13-21 | 28b (1400)+oleic acid (564). | 40 | EtO (2640). |
| 13-22 | 28bAOA | | |
| 13-23 | 29b (1635) | | (A) PrO (522) (B) EtO (1980). |
| 13-24 | 29b (1635)+oleic acid (282). | 18 | EtO (1320). |
| 13-25 | 29bO (2655)+oleic acid (282). | 18 | |
| 13-26 | 29bAOA | | |
| 13-27 | 30b (1580) | | EtO (2200). |
| 13-28 | 30b (1580)+stearic acid (569). | 40 | |
| 13-29 | 30b (1580)+stearic acid (569). | 40 | (A) PrO (464) (B) EtO (1320). |
| 13-30 | 30bAOA | | |

2. USE IN INCREASING PRODUCTION OF PETROLEUM OIL FROM SILICEOUS STRATA IN PRIMARY OIL OPERATIONS

This phase relates to the use of the aforementioned compounds in treating sandy or siliceous geological formations or strata penetrated by the surrounding oil well bores or cavities to render such formations preferentially wettable by oil so as to increase the proportion of oil and

TABLE XV.—THE OXYALKYLATED PRODUCTS OF TABLE VI

| Example | Grams of oxide added per gram-mole of acylated product | | | | |
|---|---|---|---|---|---|
| | EtO | PrO | BuO | Octylene oxide | Styrene oxide |
| 1cAO | 132 | | | | |
| 2cAO | | | | | 390 |
| 3cAO | 880 | | | | |
| 4cAO | 1,320 | | | | |
| 5cAO | 220 | | | | |
| 6cAO | | | | 256 | |
| 7cAO | | | | 216 | |
| 8cAO | | | 348 | | |
| 9cAO | | | 432 | | |
| 10cAO | 880 | 870 | | | |
| 11cAO | 880 | 870 | 216 | | |
| 12cAO | 1,320 | | 288 | | |

TABLE XVI.—THE OXYALKYLATED PRODUCTS OF TABLE VII

| Example | Grams of oxide added per gram-mole of acylated product | | | | |
|---|---|---|---|---|---|
| | EtO | PrO | BuO | Octylene oxide | Styrene oxide |
| 1dAO | 132 | | | | |
| 2dAO | | | | 512 | |
| 3dAO | | 174 | | | |
| 4dAO | | | | 216 | |
| 5dAO | | | | | 520 |
| 6dAO | | | 432 | | |
| 7dAO | 660 | | | | |
| 8dAO | 1,100 | | | | |
| 9dAO | 1,760 | | | | |
| 10dAO | 1,980 | | | | |
| 13dAO | 660 | 580 | | | |
| 14dAO | 660 | 1,450 | | | |
| 15dAO | 660 | 1,740 | 288 | | |
| 16dAO | 1,100 | 2,320 | 432 | | |
| 17dAO | | 870 | 216 | | |
| 18dAO | | 1,450 | 216 | | |
| 19dAO | | 1,740 | 432 | | |
| 20dAO | | 2,610 | | | |
| 21dAO | | 2,900 | | | |
| 22dAO | | 3,190 | | | |

Since the oxyalkylated, and the acylated and oxyalkylated products have terminal hydroxy groups, they can be acylated. This step is carried out in the manner previously described for acylation. These examples are illustrative and not limiting.

*Example 1aOA*

One mole (919 grams) of 1aO mixed with 846 grams (three moles) of oleic acid and 300 ml. xylene. The reaction mixture is heated to about 150–160° C. over a period of 2 hours until 54 grams (3 moles) of water are removed. Xylene is then removed under vacuum. The product 1aOA is xylene soluble.

*Example 1aAOA*

The process of the immediately previous example is repeated using 1aAO. The product 1aAOA is xylene soluble.

Additional examples are presented in the following tables. All of the products are dark, viscous liquids.

TABLE XVII.—THE ACYLATED PRODUCTS OF TABLES IX, X, XI, XII

| Example | Acid | Grams of acid per gram-mole of oxyalkylated product | Grams water removed |
|---|---|---|---|
| 1aOA | Oleic | 282 | 18 |
| 2aOA | do | 282 | 18 |
| 3aOA | do | 282 | 18 |
| 4aOA | Stearic | 284 | 18 |
| 28aOA | do | 284 | 18 |
| 1bOA | Myristic | 228 | 18 |
| 2bOA | Stearic | 284 | 18 |
| 3bOA | Oleic | 282 | 18 |
| 4bOA | do | 282 | 18 |
| 28bOA | Stearic | 284 | 18 |
| 29bOA | Oleic | 282 | 18 |
| 30bOA | Lauric | 200 | 18 |
| 1cOA | Oleic | 282 | 18 |
| 2cOA | do | 282 | 18 |
| 3cOA | do | 282 | 18 |
| 4cOA | Stearic | 284 | 18 |
| 1dOA | Oleic | 564 | 36 |
| 2dOA | Stearic | 568 | 36 |
| 3dOA | Oleic | 564 | 36 |
| 4dOA | do | 564 | 36 |

TABLE XVIII.—THE ACYLATED PRODUCTS OF TABLES XIII, XIV, XV, XVI

| Example | Acid | Grams of acid per gram-mole of oxyalkylated product | Grams water removed |
|---|---|---|---|
| 1aOA | Oleic | 282 | 18 |
| 2aAOA | Stearic | 284 | 18 |
| 3aAOA | Oleic | 282 | 18 |
| 4aAOA | Stearic | 284 | 18 |
| 28aAOA | Lauric | 200 | 18 |
| 1bAOA | Oleic | 282 | 18 |
| 2bAOA | do | 282 | 18 |
| 3bAOA | Stearic | 284 | 18 |
| 4bAOA | Oleic | 282 | 18 |
| 28bAOA | Stearic | 284 | 18 |
| 29bAOA | Oleic | 564 | 36 |
| 30bAOA | do | 282 | 18 |
| 1cAOA | Myristic | 228 | 18 |
| 2cAOA | Lauric | 200 | 18 |
| 3cAOA | Oleic | 282 | 18 |
| 4cAOA | do | 282 | 18 |
| 1dAOA | Stearic | 568 | 36 |
| 3dAOA | do | 568 | 36 |
| 3dAOA | Oleic | 564 | 36 |
| 4dAOA | do | 564 | 36 |

1. USE IN TREATING WATER INTRODUCED INTO UNDERGROUND FORMATIONS

This phase of our invention relates to the use of the aforementioned compositions in treating water introduced into underground formations, for example, in disposal wells and in the recovery of petroleum from subterranean formations in water flooding operations.

The technique of water flooding to recover oil from depleted oil fields is well known. In general, such process consists in introducing an aqueous medium into one or more injection wells, which penetrate a depleted oil-producing formation, and forcing said medium through the formation towards a production well, which likewise penetrates the formation. In the so-called "five-spot drive," the aqueous medium is forced down four injection wells which are more or less symmetrically located around a producing well. As the flooding medium passes through the formation it strips or flushes the residual oil therefrom and carries it into the producing well from which it is recovered by conventional means. The flooding medium usually comprises water or oil field brine to which has been added various conditioning materials, e.g., surface active agents or detergents which promote the desorption of the residual oil from the formation, sequestering agents which prevent the deposition of calcium and/or magnesium compounds in the interstices of the formation, bactericides which prevent the formation from becoming plugged by bacterial or algae growth, corrosion decrease the proportion of water produced by a given well.

Such alteration in ratio of fluid volumes produced may accomplish any one of a number of specific results which vary with local conditions. In some instances wells can be converted from unproductive wells to productive wells; i.e., strata which would not otherwise justify commercial exploitation can be operated on a sound basis. In some cases treatment of the kind herein contemplated will cause a productive well to yield an even greater output of crude oil, i.e., increase its productivity. Furthermore, not only does such treatment involve a change in the rate at which oil may be produced but also it may yield a greater total output of oil from a particular well, cavity or formation volume, than would be otherwise possible. In other words, such treatment not only affects current rate of production but also the entire volume of oil produced during the life of the well.

Chemical treatment of an oil well of the kind herein described may not only accomplish one or more of the results or objects above mentioned; but also it will reduce current lifting charges due to the fact that a greater amount of water is left behind in the strata when the final depletion stage is reached. Additional objects are obvious; to wit, in many instances objectionable operating conditions, such as corrosion, emulsion formation, etc., may be decreased or eliminated, due to the lesser amount of water produced per barrel of oil.

This phase of our invention relates to the use of the compounds of our invention to impart oil wettability to sandy or siliceous strata and produce the above advantages. In its broadest aspect, the present invention is concerned with the application of the described agents in any suitable or feasible manner.

It is generally recognized that sand is more readily wet by water than by oils. As a result, the encroachment of water into oil-bearing sand formations is greatly favored by the forces of capillary attraction. Such encroachment results finally in the "breaking through" or rising of water into the well bore. Water is then produced along with the oil. In addition, water decreases the production of oil, since its presence in capillary channels blocks the flow of oil which would otherwise occur through these channels. This effect is particularly objectionable when it occurs at the face of the bore hole and in its immediate vicinity as the rate and volume of oil production appears to be highly dependent upon the area of oil permeable formation exposed to the open hole.

In a preferentially water-wettable capillary system, such as is formed by ordinary sand formations, water is strongly held and its displacement by oil is opposed by the force of the interfacial tension at the oil-water interface. The treating process of the present invention changes the sand formation to one preferentially wet by oil with the result that the force of interfacial tension at the oil-water interface then favors the displacement of water by oil in the capillary system, or, conversely, opposes the displacement of oil by water.

In practicing our process, the sand formation is treated by pumping a solution of the reagent into the formation and allowing it to remain sufficiently long for adsorption on the sand grains to occur. The reagent may be put into solution as such or in the form of salt such as the chloride, phosphate, acetate, sulfate, or other salt which is sufficiently soluble in the solvent used. Some compounds of this invention are rather insoluble in water, and, therefore, their salts are used when water is chosen as the solvent. However, in non-aqueous or oil solvents such as alcohols, kerosene, and crude oil, they are often sufficiently soluble to be employed directly.

The reagents used in the present process are effective in very dilute solutions, such as 0.01% by weight or even less and may be employed in such dilution. In many instances, the effectiveness of a solution containing a few hundredths of a percent of a selected agent can be demonstrated readily by immersing an absolutely clean water-wettable silica plate about the size of a microscopic slide in such very dilute solution of the selected compound and agitating gently for a short period of time, for instance, a few minutes to a few hours, and then noting that the silica plate surfaces have been converted from a hydrophile state to a definitely hydrophobe state. However, we prefer to use stronger solutions in order that appreciable amounts of treating reagent may be introduced into the formation without the handling of inconveniently large volumes of solution and without added cost due to labor, shutdown time, etc. The usual concentrations of reagent employed in solution are from 1% to about 25% by weight. In certain instances even more concentrated solutions may be employed.

In the most desirable solutions, we prefer to use, roughly speaking, 10–20% by weight of these compounds. Such solutions also have solvent and emulsifying power for both water and oil, and thus are effective in removing water or oil sheaths surrounding the sand grains of the formation being treated, thereby putting the grains into immediate contact with the treating solution. The solutions which we prefer to employ are characterized by the fact that, in addition to the treating reagent, they contain water, an oil, and an alcohol. It is a remarkable fact that mixtures of this kind can be found which, in the proper proportions, are perfectly clear and homogeneous. The stability of these solutions appears to arise partly from the presence of the actual treating reagents, which, because of their structure, probably act in a manner analogous to ordinary soaps insofar as their solubilizing power is concerned.

The alcohols which can be used in preparing our preferred treating solutions are those containing three or more carbon atoms and less than 30 carbon atoms, and may be either primary, secondary, or tertiary. Those most widely applicable are the primary and secondary aliphatic, alicyclic, mixed aliphatic-alicyclic, and aliphatic ether alcohols containing from four to 10 carbon atoms and including such alcohols as n-butanol, 2-butanol, 2-ethyl hexanol, n-hexanol, cyclohexanol, ethylene glycol monobutyl ether, diethylene glycol monoamyl ether, a terpineol, furfuryl alcohol, oxidized pine oil, rosin oil, and the like. The choice of proper alcohol and its proportion in the mixture depends somewhat upon the treating reagent used, the amount and kind of oil employed, and the proportion of water used and is best determined by preparing experimental mixtures on a small scale. Various representative formulae will subsequently be given.

The oils which can be used in preparing our preferred treating solutions are the liquid, water-insoluble hydrocarbons and chlorinated hydrocarbons, and preferably those which have high solvent power for crude oils. Examples of suitable oils are: kerosene, gasoline, benzol, carbon tetrachloride, dichlorethane, xylene, turpentine, pressure distillate, amylene dichloride, and the like. Crude oil itself may be used in some instances.

As examples of the preferred types of treating solutions to be used in the present process, the following formulae are presented wherein proportions are by weight.

Treating solution #1:

| | Percent |
|---|---|
| Active compound | 10 to 14 |
| n-Butanol | 18 to 14 |
| Water | 38 to 42 |
| Kerosene | 34 to 30 |

The sand surfaces treated by the present process show a strong affinity for non-polar materials such as oil, asphalt, bitumen, and the like. In some instances, it is advantageous to follow our treating process with a treatment with an asphalt or bitumen solution. When this is done, the sand becomes covered with a uniform adsorbed layer of the asphalt or bitumen which tends to protect the under layer of adsorbed compounds and renders the surface even more water-repellent. However, this after-treatment can often be eliminated and the same effect be obtained by incorporating asphalt or bitumen in the original treating solution. If the original treating solution consists of an oil solution, the asphalt or bitumen is simply dissolved in the oil with the treating reagent. With homogeneous solutions of the kind described in the above examples, the asphalt or bitumen is dissolved in the oil used in preparing the solution, and this is then mixed with the other ingredients. By proper choice of proportions of ingredients, clear, homogeneous mixtures are obtainable. Below is an example of a treating solution incorporating asphalt as one of the constituents.

Treating solution #2:                          Percent
    Active compound ----------------------- 12 to 13
    n-Butanol ----------------------------- 17 to 18
    Kerosene ------------------------------ 28 to 22
    High melting asphalt ------------------ 1
    Water --------------------------------- 42 to 46

The compounds used in our process are apparently capable of forming association complexes with long chain aliphatic alcohols, which complexes are more soluble in hydrocarbon oils than the original compounds. Solutions containing such long chain alcohols are suitable for treating sand to make it preferentially oil-wettable and in some instances appear to improve the water repellent properties of the adsorbed film. Long chain alcohols can be incorporated in an oil solution of the treating reagent or into solutions of the type previously described, in which case the final treating solution may contain two different alcohols, one of high molecular weight, and one of lower molecular weight, as illustrated by the following:

Treating solution #2:                          Percent
    Active compound ----------------------- 11 to 10
    n-Butanol ----------------------------- 17 to 16
    Cetyl alcohol ------------------------- 9 to 5
    Kerosene ------------------------------ 21 to 28
    Water --------------------------------- 42 to 41

As previously stated, the treating reagents can be employed in the form of simple aqueous or oil solutions. Such solutions lack some of the good features of our preferred solutions such as high solvent and emulsifying power for the well fluids, but because of their cheapness and simplicity of preparation will often be used. Examples of these solutions are as follows.

Treating solution #4:                          Percent
    Active compound ----------------------- 1
    Water --------------------------------- 99

Treating solution #5:
    Active compound ----------------------- 1
    Benzene ------------------------------- 9
    Kerosene ------------------------------ 90

Treating solution #6:
    Active compound ----------------------- 1
    Denatured alcohol --------------------- 9
    Water --------------------------------- 90

*Example*

This example illustrates a procedure for carrying out the process of this phase of the present invention on a typical oil well producing from a sand formation and equipped with the usual casing and tubing. If the well is producing water, it is well to determine from what portion of the formation it is coming, as treatment may then be localized to this section with consequent savings in cost of reagent. The main source of water, if any, can often be located by pumping the well from various parts of the open hole which have been separated from the remainder by means of formation packers. After deciding from such tests which portion of the formation is to be treated, the tubing is packed so as to communicate with this section. The treating fluid, Treating Solution #1 above, wherein the active compound is 14-1 of the following table and which contains 14% of 14-1, 14% of n-butanol, 42% water and 30% kerosene, is then run into the tubing and finally into the formation, pump pressure being applied if necessary to displace it into the sand. In this case pump pressure is required. The amount of solution required will depend upon the amount of open formation being treated but usually will vary from about 4 to about 100 barrels. In this case 25 barrels are employed when all of the solution has been introduced into the tubing, crude oil is then pumped in after it to act as a piston to drive the solution back into the formation. The oil is pumped in slowly so that the treating solution will be in contact with the formation particles for at least a few seconds. Adsorption from the solution occurs very rapidly, however. As more oil is introduced, the treating solution is gradually pushed farther and farther into the formation. Finally all of the solution will have entered the sand and the crude oil will begin to penetrate the treated portions, thus immediately saturating the capillaries with oil which now adheres strongly to the sand surfaces. On being pushed further into the formation, the treating solution eventually becomes spent due to adsorption of the active ingredients and dilution with the formation fluids. The amount of crude oil pumped into the formation behind the treating solution preferably is at least equal the volume of treating solution used and the use of even larger volumes is desirable, since it insures deep penetration of the treating fluid and thorough oil saturation of treated capillaries immediately surrounding the bore hole.

Following treatment, the well is kept shut in for a few hours, after which it is put back on production.

In carrying out our process, it is not necessary to take precautions against the treating solution entering the oil producing portions of the formation, as no plugging precipitates are formed. If desired, the use of a formation packer may be eliminated and the entire formation, both oil and water producing, may be treated. In some instances wells producing no water at all are treated in order to prevent water encroachment.

The following examples are presented to illustrate how the composition of this invention can impart hydrophobic properties to sand normally found in oil areas and thus act in the manner described in the above example.

*Example*

Sand found in various oil drilling is contacted with various solutions prepared according to Treating Solution #1 wherein the active compound is one or more of those shown in the following table. By such treatment the sand is rendered hydrophobic as contrasted with its previous hydrophilic condition.

SAND TREATING COMPOUND

| Ex. No. | I | | Weight of Oxides Added to I (grams) |
|---|---|---|---|
| | Reactants (grams) | H₂O Eliminated (grams) | |
| 14-1 | 1a (439)+oleic acid (846) | 54 | None. |
| 14-2 | 1a (439)+oleic acid (846) | 72 | Do. |
| 14-3 | 1a (439)+lauric acid (600) | 54 | Do. |
| 14-4 | 1a (439)+lauric acid (600) | 72 | Do. |
| 14-5 | 1a (439)+stearic acid (852) | 54 | Do. |
| 14-6 | 1a (439)+stearic acid (852) | 72 | Do. |
| 14-7 | 2a (568)+stearic acid (852) | 54 | Do. |
| 14-8 | 2a (568)+stearic acid (852) | 72 | Do. |
| 14-9 | 3a (679)+oleic acid (846) | 54 | Do. |
| 14-10 | 3a (679)+oleic acid (846) | 72 | Do. |
| 14-11 | 3b (552)+oleic acid (564) | 36 | Do. |
| 14-12 | 3b (552)+oleic acid (564) | 54 | Do. |
| 14-13 | 1c (645)+lauric acid (600) | 54 | Do. |
| 14-14 | 1d (660)+oleic acid (1128) | 72 | Do. |
| 14-15 | 6a (1330)+oleic acid (1128) | 72 | PrO (174). |
| 14-16 | 10a (1075)+oleic acid (1128) | 72 | BuO (216). |
| 14-17 | 1a (439)+oleic acid (846) | 54 | PrO (348). |
| 14-18 | 1a (439)+oleic acid (846) | 54 | Octylene oxide (384). |
| 14-19 | 1d (660)+oleic acid (1128) | 72 | Styrene oxide (260). |
| 14-20 | 1d (660)+oleic acid (1128) | 72 | BuO (288). |

SAND TREATING COMPOUND—Continued

| Ex. No. | I | | Weight of oxides added to I in alphabetical order (grams) |
|---|---|---|---|
| | Reactants (grams) | $H_2O$ eliminated (grams) | |
| 14-21 | 28a (1960) | | (A) PrO (580). |
| 14-22 | 28a (1960)+lauric acid (600). | 120 | (A) PrO (116) (B) EtO (1320). |
| 14-23 | 28aO (3054)+stearic acid (284). | 18 | |
| 14-24 | 28aAOA | | |
| 14-25 | 28b (1400) | | EtO (1980). |
| 14-26 | 28b (1400)+oleic acid (564). | 40 | EtO (2640). |
| 14-27 | 28bAOA | | |
| 14-28 | 29b (1635) | | (A) PrO (522) (B) EtO (1980). |
| 14-29 | 29b (1635)+oleic acid (282). | 18 | EtO (1320). |
| 14-30 | 29bO (2655)+oleic acid (282). | 18 | |
| 13-31 | 29bAOA | | |
| 14-32 | 30b (1580) | | EtO (2200). |
| 14-33 | 30b (1580)+stearic acid (569). | 40 | |
| 14-34 | 30b (1580)+stearic acid (569). | 40 | (A) PrO (464) (B) EtO (1320). |
| 14-35 | 30bAOA | | |

3. REMOVING MUD SHEATHS FROM OIL WELLS

This phase of our invention relates to the use of the aforementioned compositions to remove from a well or from an oil- or gas-bearing formation penetrated by a well, a substantially impervious, mud-like sheathing or coating, resulting from the use of drilling fluids in the drilling operation or resulting from the presence in the hole, at some other time, of fluids capable of producing such sheaths. Such use increases the productivity of a well by providing a novel procedure for removing from the face of the producing formation various solids, such as natural clays, deposited thereon during drilling or subsequently. It makes possible the recovery of oil or other fluids from relatively shallow formations which were penetrated during the drilling to greater depths and which were "mudded-off" by deposition of solids from the drilling fluid.

By the term "mudded-off formation" we means a formation or stratum, the walls of which have been more or less effectively sealed by an impervious sheath of solids derived from the drilling fluid. Naturally-occurring clays are commonly used to prepare drilling fluids. In some cases, wells "make their own mud," the formations encountered containing clay of such properties that it is unnecessary to import the ingredients for preparing the drilling fluids. Where natural clays are found deficient in one or more properties, they may be conditioned to improve their specific gravity characteristics, their viscosity, or their gel-forming propensities by the addition of other materials. For example, weighting materials, such as barite or hematite may be added; or bentonite may be used to improve the viscosity and gel-forming characteristics. In rarer cases, the drilling fluid may be prepared entirely from a weighting material such as barite, and a stabilizer, such as bentonite, in the total absence of naturally-occurring clays or "muds." In this description we shall use the term "mud" to include drilling fluids of any and all of the foregoing types and the term is to be construed to apply to all of them with equal force.

The deleterious effects of drilling muds are of several kinds, the principal one being the deposition of mud sheaths on the face of the formation penetrated. While this deposition of a mud sheath is desirable in the upper portions of the hole, it is extremely undesirable when the producing horizon has been reached. It is also undesirable in the upper strata or portions of the hole when and if it later becomes necessary or desirable to test the productivity of such upper strata.

The problem thereby presented exists in wells drilled into high-pressure formations, as well as in wells penetrating low-pressure areas, and in partially or entirely depleted formations. In semi-depleted fields, where formation pressures have declined to small values, the problem is most serious. There are numerous instances on record where, although wells have been drilled into proven producing horizons, no oil can be commercially produced at present; and where, unless some means is found to remove the sheaths, large reserves of oil will be lost.

Various mechanical means have been employed to remove the sheaths, with only partial success. Washing with water has been attempted, in many cases unsuccessfully. In the case of some oil wells previously washed unsuccessfully with water, application of our process has resulted in the removal of a large amount of mud, usually with very gratifying consequences as to increased productivity.

The process which constitutes this phase of the present invention may be practiced in various ways, and may be applied at various times in the life of a well. It may be applied immediately upon completion of the well, or even prior to completion. It may be used on wells during or upon depletion. It may be used on wells which, upon depletion of a lower formation, or upon the discovery that such deeper formation is unproductive, have been plugged back to higher formations previously disregarded in drilling and which may now be required to be explored. It may be used on wells which, because of the presence of such mud sheaths, have never been productive. Our process is also applicable to those cases where the sheaths result from mud introduced into a well subsequent to drilling, e.g., for the purpose of killing the well. It is also applicable to those comparatively rare cases where mud sheaths are deposited during cable-tool drilling.

In some instances, the mud used in drilling or reworking a well infiltrates to a greater or lesser depth into the natural formation where it sets up a barrier to productivity. The present process is applicable to the removal of mud solids occurring as such infiltrated mud sheaths or barriers.

The process constituting this phase of the present invention is not to be confused with any process designed to remove clogging deposits of wax, asphaltic materials, paraffin or the like from wells, or to prevent their deposition. Such deposits of organic materials constitute a recurring problem. On the contrary, once a mud sheath has been removed by means of the present process, it can seldom again constitute a problem in that well.

Our process includes the application of a compound of the kind described to a mud sheath, however produced, which exists in a well, e.g., on the walls of an oil-bearing formation, in such a manner that the relatively impervious sheath is removed and the well is rendered productive or the existing productivity thereof is increased.

In practice, the compounds of the present invention are dissolved in a suitable solvent, for example, water or a water-insoluble organic liquid which is capable of acting as an oil solvent. Depending on the choice of compound, the solubility may be expected to range from ready water-solubility in the free state to water-dispersibility. The salts, and specifically the acetates, generally show improved water-solubility; and we have obtained good results by using salt forms which possess appreciable water-solubility. One of the most common of the oil solvents is the aromatic fraction of petroleum distillates, which is quite generally found to disperse these compounds. Another is the fraction removed from distillates by application of the Edeleanu liquid sulfur dioxide extraction process, and which comprises aromatic and unsaturated compounds. In some cases, stove oil or similar petroleum distillate is usable. Oil solvents like carbon tetrachloride or carbon disulfide are usable, although their comparatively high cost militates against their use. Amylene dichloride is sometimes a desirable material for the present purpose, as are tetrachloromethane, tetralin, trichloroethylene, benzol and its homologues, cyclohexane, etc. This component of our reagent must be water-insoluble and must be an oil solvent. Otherwise, its selection is not limited, although it should be compatible with the other ingredient of our reagent. Naturally, its cost and availability will influence the selection. We prefer to use aromatic petroleum solvent since it is a widely available reagent of low cost and has good properties for the present use.

We do not desire to be limited to any specific water-insoluble organic liquid. All that is required is that it shall be capable of acting as an oil solvent. The choice of liquid employed, however, can be influenced in part by the bottom-hole temperatures expected to be encountered. The character of the oil being produced can also affect the choice, and the character of the mud used in drilling the well can also be important. The choice will frequently depend upon relative cost of solvents.

A mixture of organic liquids having the specific property of dissolving petroleum oil is very effective. One such mixture which we have employed contains benzol, toluol, carbon tetrachloride, tetralin and kerosene. These solvents are exactly those disclosed in Patent No. 2,153,589. The proportions of these solvents recited in said earlier patent are equally satisfactory for use in preparing the present reagents. Such proportions recited in said patent are: benzol, 35 lbs.; toluol, 15 lbs.; carbon tetrachloride, 16 lbs.; tetraline, 40 lbs.; and kerosene, 8 lbs.

To prepare our reagents, one simply mixes the two components (i.e., compounds of the present invention plus a suitable solvent) together in suitable proportions. The optimum proportion of each will vary depending upon its properties; but in general, the resulting mixture should be homogeneous.

Where an organic solvent is employed, the finished solution should produce a relatively stable aqueous dispersion in water. In cases where the two ingredients form thoroughly homogeneous mixtures, which, however, are not water-dispersible, transformation of the compounds of this invention into the salt form will sometimes render the solution water-dispersible. In such cases we have preferably employed acetic acid to effect the neutralization.

The reagents are preferably employed in the form of an aqueous dispersion or solution, although sometimes favorable results are obtained merely by introducing the undiluted compound or the compound dissolved in an organic solvent into the well whose productivity is to be improved. In some of such cases, undoubtedly, there is produced in the well bore, or in the formation, an aqueous dispersion of the reagent in water present in such bore or such formation. Production of an aqueous dispersion from the organic solution and water is accomplished almost spontaneously on mixing the two, in most cases. We greatly prefer to employ the reagents in the form of an aqueous dispersion because in that manner the two components are prevented from separating from each other before the reagent can become effective to remove the mud sheaths.

It is also noteworthy that our present reagents are useful in the presence of acids. They can therefore be applied satisfactorily to wells that have been acidized by the use of hydrochloric or hydrofluoric or other acid. The reagents of Patent 2,153,589, above-mentioned, would react with such acidizing acids to liberate free sulfonated fatty acids which would either be water-insoluble per se or else would readily become water-insoluble on hydrolysis and loss of their acid sulfate radical. The present reagents would be quite stable in the presence of such acidizing acids.

We prefer to employ a considerable excess of our compounds over the amount required to effect dispersion of the water-insoluble organic liquid in water. Such excess further prevents any separation of the phases, thereby enhancing the stability of the dispersion to such an extent that it will remain stable for at least several hours. The excess also acts to lower the surface tension of the whole reagent so that the reagent exhibits a marked penetrating effect and is carried into the crevices and irregularities of the deposit, weakening the bond between the mud sheath and the supporting wall. Also it penetrates the formation to a considerable distance and facilitates the return of drilling water to the hole.

The proportions of oil solvent and active compounds of this invention can be varied within wide limits. For example, we have prepared our reagents in a form in which they contain 4 parts of active compound to 1 part of oil solvent. We have likewise prepared them in a form in which they contain 4 parts of oil solvent to 1 part of active compound. Both forms were relatively stable and did not separate appreciably into their components on standing for protracted periods of time. We have likewise prepared our reagents in a form in which they contain 9 parts of active compound and 1 part of oil solvent; and in a form in which they contain 1 part of active compound per 9 parts of oil solvent. We have determined that the proportion of active compound and oil solvent can advantageously vary within the range of 9:1 and 1:9.

As a preferred example of reagent we employ a 20 weight percent dispersion of active compound in an aromatic petroleum solvent and include 2% of concentrated acetic acid in the finished reagent where the salt formed is desired. We prefer to employ this reagent in the form of a dilute aqueous dispersion of about 5 weight percent concentration. Sometimes aqueous dispersions containing as little as 1% of the reagent are fully effective. Sometimes it is desirable to introduce the reagent in the form of a more concentrated aqueous dispersion as when additional water is expected to be encountered in the well bore or the surrounding formation. The reagent can even be introduced in undiluted form although, as stated above, we prefer not to use it in this form. Thus the amount of active compound present in the treating reagent can range from 1 to 100%, but preferably 5 to 25% by weight based on the weight of treating reagent.

From the foregoing, it will be understood that this phase of our invention includes subjecting a mud sheath of the kind mentioned to the action of a reagent of the kind described. Merely injecting such reagent into a well which has been mudded-off sometimes results in the more or less complete removal of the sheath. Agitating the reagent in the well after it has been injected therein usually produces more favorable results, however. Any of the various methods available for agitating a fluid in the hole, such as swabbing or use of perforation washers, can be applied during the injection of the reagent or before or after the period during which the reagent is allowed to stand quiescent in the well. Agitating the fluid after allowing the reagent to stand in the well for a period of time in order to penetrate and soften the sheaths produces very favorable results. If a perforation washer is employed to agitate the fluid, it may be desirable to "spot" therewith, i.e., inject at various levels, additional quantities of the reagent before agitating.

Our preferred method of cleaning an oil well of mud sheaths is as follows: Remove any debris present in the bottom of the hole, for example, by bailing. Then replace the head of oil standing in the well as completely as possible with a 5 weight percent aqueous solution or dispersion of the reagent. Allow the solution or dispersion to stand in the hole a suitable period of time. (We have found that a period of standing ranging from 8 to 24 hours produces acceptable results.) Then introduce an additional quantity of solution or dispersion into the well and immediately thereafter agitate the fluid in the well by swabbing or operating a perforation washer therein. After agitating the dispersion in the hole by any desired means, and so scrubbing or washing the sheath from the formation walls (swabbing or other means may be employed if required or desired) to bring additional quantities of mud into the hole, the debris dislodged by the use of our reagent is removed with a bailer or in any other desired manner. The well is preferably not put on the pump until no further amounts, or only small amounts, of mud are being recovered.

The above-recited procedure for operating this process is exemplary only. The procedure may be varied as conditions may require. In all cases, however, it consists broadly in the application of our reagent to the mud sheaths; and, of course, subsequently removing from the well the debris accumulated in the well as the result of such application.

It will be obvious that our process is applicable to the removal of any mud sheath present on the perforated pipe in the well in addition to that present on the walls of the formation. However, we consider the removal of the sheath from the formation wall the more important function of our process.

The following is presented to illustrate our invention:

*Example*

A freshly drilled well whose oil flow is slow by the preferred method described above due to the formation of a mud sheath is treated by the preferred method described above with a 5 weight percent aqueous solution of compound 18-1 of the following table for a period of 10 hours. Agitation of the solution is effected by the operation of a perforated washer. The debris dislodged is removed by means of a bailer. After all debris is removed, the well is put on the pump again.

To show the effect of these compounds on mud sheaths, large sections of hardened mud sheaths are removed from actual oil wells and treated with a 5 weight percent aqueous solution or dispersion of the compounds shown in the following table. After standing overnight, the mud sheaths are easily broken into a fine dispersion.

MUD SHEATH REMOVAL AGENT

| Ex. No. | I | | Weight of oxides added to I (grams) |
|---|---|---|---|
| | Reactants (grams) | $H_2O$ eliminated (grams) | |
| 18-1 | 1a (439)+oleic acid (846) | 54 | EtO (1320). |
| 18-2 | 1a (439)+oleic acid (846) | 72 | EtO (1540). |
| 18-3 | 6a (1330)+oleic acid (846) | 72 | EtO (1760). |
| 18-4 | 9a (943)+oleic acid (846) | 72 | EtO (1980). |
| 18-5 | 1b (492)+oleic acid (564) | 36 | EtO (1540). |
| 18-6 | 2b (662)+lauric acid (400) | 36 | EtO (1760). |
| 18-7 | 2b (662)+lauric acid (400) | 36 | EtO (2200). |
| 18-8 | 3b (552)+stearic acid (568) | 36 | EtO (1320). |
| 18-9 | 1d (660)+lauric acid (800) | 72 | EtO (1760). |
| 18-10 | 1d (660)+lauric acid (800) | 72 | EtO (2200). |
| 18-11 | 2d (832)+oleic acid (1128) | 72 | EtO (1848). |
| 18-12 | 2d (832)+oleic acid (1128) | 72 | EtO (2550). |
| 18-13 | 4d (772)+lauric acid (800) | 72 | EtO (1760). |
| 18-14 | 13d (688)+lauric acid (800) | 72 | EtO (2290). |
| 18-15 | 16d (800)+lauric acid (800) | 72 | EtO (2640). |

| Ex. No. | I | | Weight of oxides added to I in alphabetical order (grams) |
|---|---|---|---|
| | Reactants (grams) | $H_2O$ eliminated (grams) | |
| 18-16 | 28a (1960) | | (A) PrO (580). |
| 18-17 | 28a (1960)+lauric acid (600) | 120 | (A) PrO (116). (B) EtO (1320). |
| 18-18 | 28aO (3054)+stearic acid (284) | 18 | |
| 18-19 | 28aAOA | | |
| 18-20 | 28b (1400) | | EtO (1980). |
| 18-21 | 28b (1400)+oleic acid (564) | 40 | EtO (2640). |
| 18-22 | 28bAOA | | |
| 18-23 | 29b (1635) | | (A) PrO (522) (B) EtO (1980). |
| 18-24 | 29b (1635)+oleic acid (282) | 18 | EtO (1320). |
| 18-25 | 29bO (2655)+oleic acid (282) | 18 | |
| 18-26 | 29bAOA | | |
| 18-27 | 30b (1580) | | EtO (2200). |
| 18-28 | 30b (1580)+stearic acid (569) | 40 | |
| 18-29 | 30b (1580)+stearic acid (569) | 40 | (A) PrO (464) (B) EtO (1320). |
| 18-30 | 30bAOA | | |

4. USE IN FRACTURING OIL WELLS

This phase of the invention relates to the use of the aforementioned compositions in wells, especially those drilled for oil or gas, to facilitate the flow of fluids in an earth formation penetrated by the bore of a well by the injection into the formation through the well bore of liquids carrying in suspension particulated solids.

Among the methods in current use for facilitating flow of fluid either into or out of earth formations penetrated by the bore of a well are those involving liquid injection into the earth through the well bore at hydrostatic pressures great enough to form channels or passageways by fracturing or parting the earth formations into which the liquid is injected. In such injections, the pressures used are oftentimes greater than those required to lift the overburden of earth and at least great enough to exceed the bonding strength of the formations encountered. While it is apparent that fractures or cracks may be formed in oil- or gas-bearing formations by the hydraulic action described, as a result of which the facility with which oil or gas flows to the well may be increased, the difficulty may arise that on releasing the pressure on the injected liquid used to create the fractures or cracks these tend to close due to the weight of the overburden. As a consequence, it is generally the practice during fracturing to convey into the earth a particulated hard solid material, such as sand in suspension in the fracturing medium. The particulated solids on being carried into the fractures or cracks formed by the high pressure hydraulic action described, act as props and hold open the fractures and cracks after the injection pressure is released. But certain disadvantages inure to this practice which limits its usefulness. Among these are that the particulated solids comprising the propping agent do not remain suspended in the liquid media conventionally used to convey the solids into the earth formation. These media are hydrocarbon liquids, such as gasoline, kerosene, crude oil, and the like, generally rendered more viscous by dissolving therein a thickening agent, such as soap. As a consequence of the tendency for the particulated solids to settle in all such conveying media, special mixing facilities must be provided at the well site to mix, and maintain in suspension, the particulated solids in the conveying medium while making the injection into the well. The thickened or viscous oils oftentimes conventionally used have the added disadvantage that they are difficult to pump through the well tubing and do not return from the earth formation after their injection so that an especial treatment of the earth formation is required to purge it of the injected liquid. Still another disadvantage is that if, during an injection into the well of the conventional mixture of conveying liquid and particulated solid, it should become necessary to stop the injection, settling out of the propping agent occurs in the injection pump and piping connecting the pump with the well and in the well bore or well tubing, if such be used, making it difficult, if not impossible, to restart the injection operation.

The compositions of our invention are excellent emulsifiers in these systems and so provide an improved method of treating earth formation penetrated by the bore of a well, so as to facilitate flow of fluid into or out of the earth formation, involving the conveying of particulated solids, e.g., sand, through the well into the earth formation, whereby the foregoing disadvantages are overcome.

This phase of the invention is predicated upon forming a pumpable fluid emulsion, comprising immiscible liquids, mixing therewith a suitable particulated solid material, and then injecting the resulting mixture into the earth formation through the well. The particles of the solid material or propping agent are entrained in the emulsion at the interface between the particles of the liquid phases of the emulsion and thereby are held in substantially permanent suspension without the need for continuous agitation during injection. The emulsion mixture is easily pumped and either readily penetrates permeable earth formation or can be forced into the earth by the application of sufficient pressure. On passing into the earth formation, the emulsion spontaneously breaks thereby releasing the particles of propping agent which become lodged in the fractures or cracks of the formation into which the injection is made. The solid particles so deposited form permeable masses which hold apart the walls of the fractures, permit the return to the well hole of the emulsion liquids without returning the solid particles when the injection pressure is released, and facilitate oil flow either out of or into the formation.

In carrying out the invention at least two immiscible liquids are emulsified together in the presence of a suitable emulsifying agent, that is, one such that the emulsion obtained is capable of being injected into the interstices of an earth formation under moderate pressure and of spontaneously therein breaking. In this way, relatively low pumping pressures suffice to make the injection, and, deposition in the earth formation of the particulated solids carried into the formation by the emulsion is assured when the emulsion breaks. Suitable emulsions are obtained when one of the immiscible liquids involved constitutes the major portion of the emulsion. Proportions of near equal parts of each immiscible liquid are generally to be avoided. In other words, one of the liquids, exclusive of the emulsifying agent, should constitute substantially more than half of the emulsion, e.g., from about 55 to 98.5 percent by volume or preferably from about 66 to 97 percent of the emulsion.

For reasons of cheapness and availability, one of the liquids is preferably aqueous and may be any ground water either potable, saline, alkaline or acid, the purity of the water used apparently not being critical. A wide variety of liquids which are immiscible with the aqueous liquids are available. For example, there may be used petroleum oil, such as crude oil, petroleum fractions, such as refined oil, kerosene, gasoline, diesel oil, fuel oil, and the like, or other water immiscible hydrocarbon liquid, such as benzene, xylene, toluene, and the like.

If, in employing an aqueous liquid, it be acidified, the further advantage is realized of dissolving acid-soluble material in the earth formation and producing pore enlargement as a result. In addition, there is obtained a quick demulsification of the emulsion as its acid component becomes neutralized in the earth formation, thereby allowing the well to be put into production as soon after the injection as the necesary changes in piping at the well head can be arranged. For example, in an emulsion of dilute hydrochloric acid in oil containing an admixture of 1.5 pounds of 20 to 40 mesh Ottawa sand per gallon, the sand does not noticeably settle in an hour but by contacting the mixture of the emulsion and sand with either earth formation material containing acid-soluble matter or fine sand the emulsion loses its ability to keep the Ottawa sand in suspension and the Ottawa sand settles at the rate of at least 2000 inches per hour. In formulating emulsions using an acidified aqueous solution as one of the immiscible liquids, ordinary aqueous hydrochloric acid may be used such as that containing from about 2 to 25 percent of HCl by weight, although other concentrations may be used. A preferred concentration of the HCl is about 15 percent.

In making the emulsion, the emulsifier is preferably first mixed with the liquid in which it most readily disperses or dissolves, this liquid being the one which usually constitutes less than half of the volume of the emulsion. Emulsification of the liquids is effected in any of the ways known in the art of making emulsions. A generally satisfactory method is to stir together vigorously the liquids to be emulsified in the presence of an emulsifying agent, and, at the same time recirculate the resulting mixture. Recirculation may be accomplished by withdrawing the stirred mixture from the mixing zone and pumping it back by means of a force pump through a small orifice, e.g., one having an opening 3/16 inch in diameter.

The emulsion produced in our process possesses sufficient stability to remain unbroken for considerable periods of time and in some instances at moderately elevated temperatures, such as those encountered in deep wells. It is desirable for the emulsion to remain unbroken for as long as 30 minutes more or less, for example, and preferably longer in some cases to allow adequate time both for mixing the particulated solid material with the emulsion and for making the injection of the resulting slurry into the earth formation. The emulsion is also capable of being injected into the earth formation and spontaneously breaking on passing into the interstices of the earth formation as aforesaid. The amount of emulsifying agent required may be ascertained by trial and usually ranges from about 0.5 to 12 percent of the combined weight of the liquids to be emulsified.

Preferably as soon as the emulsion is made and the well is ready for treatment, the desired particulated solid material to be conveyed into the earth formation through the well is mixed with the emulsion in suitable proportions in any convenient manner to form a pumpable slurry. The proportions do not appear to be sharply critical and may range, for example, from about 0.5 to 6 pounds per gallon of emulsion. Various solid materials in particulate form may be used which are insoluble in the emulsion as for example, ceramic materials, metals, and rocks. Sand, because of its hardness, cheapness and general availability, is preferred. The particle sizes may vary over a considerable range. The particles should be small enough to pass into the cracks or fractures existing in the formation or produced during the injection treatment but not so small as to exhibit a low fluid permeability when deposited within the earth formation. In general, particle sizes between these extremes are to be used. Generally useful sizes of particles are those which will pass through a No. 20 standard sieve while being retained upon a No. 40 standard sieve. Other sizes may be used such as those between a No. 4 and a No. 120 standard sieve.

In order to assist in delivering the slurry to the particular formation to be treated, a packer may be placed in the well hole or casing, as the case may be, at a suitable depth. The packing means may be either the single or dual variety and set in the well by means of a string of tubing, as understood in the art. In this way, the treating materials to be subjected are confined in the well hole adjacent to the formation to be treated and there may be put under sufficient pressure to cause them to enter the formation.

Passage of the slurry, that is, the mixture of particulated solid material and the emulsion, into the earth may be preceded by an injection of a breakdown liquid such as crude oil or other available liquid or by an injection of the emulsion without the particulated solid. The injection of the breakdown liquid is made at rates comparable to those to be employed in injecting the slurry such as ½ to 5 barrels per minute or more depending upon the capacity of the pumping equipment and the pressures encountered which should not be allowed to exceed the safe working pressures of the well equipment.

During the breakdown injection, the pressure in the well rises, reaches a maximum, and then declines, thereby indicating that rupturing or fracturing of the earth formation or removal of fluid blocks in the interstices of the earth formation has occurred. In any event, irrespective of the explanation of the causes of the pressure changes during such an injection, the injection of breakdown liquid serves to insure passage into the formation of the slurry subsequently injected. In some instances the breakdown of the formation before injecting the slurry may be omitted. In such instances, it is usual for the injection pressure to pass through a maximum as in the case of the injection of a breakdown liquid. Omission of the injection of the breakdown liquid ahead of the slurry is not advisable where there is the possibility of the particulated solid becoming separated from the emulsion at the face of the formation as by filtration. It has been found that by preceding the slurry injection with an injection of oil or other breakdown liquid, as aforesaid, at rates producing a breakdown of the formation as evidenced by a change from a rising to a declining pressure occurring during the injection (without substantially changing the injection rate) the risk of the particulated solid material filtering out of the slurry at the face of the formation is reduced, if not eliminated.

The volume of breakdown liquid and of slurry to use varies widely with different earth formations and is best determined by experience using as a guide at least the amount required to produce a breakdown pressure at nominal injection rates. For example, it is a common experience in making such injections, say at about 2.5 barrels per minute, to observe a rise in the injection pressure during the initial stages of the injection and to observe a leveling off in pressure after 3 to 20 barrels of liquid has been injected. The leveling off in pressure is usually followed by a more or less sudden decline in pressure as though a break-through of the passage of liquid into the formation has taken place which permits a higher injection rate without a pressure increase.

After a breakdown of the formation is obtained, the slurry may be injected readily in an amount which is preferably at least as large as, if not larger than, the volume of liquid required to reach a breakdown pressure. For example, volumes of slurry of from 100 to 30,000 gallons have been used effectively. It is to be understood however that the injection of the slurry sometimes can be made without attaining a breakdown pressure either before or during the slurry injection. Nevertheless injection is facilitated by introducing slurry-free liquid into the well ahead of the slurry as aforesaid.

Where it is desirable to avoid freezing of the emulsion formed with water as one of the immiscible liquids, there may be added to the water a water-soluble alcohol, e.g., ethyl alcohol, in amount sufficient to lower the freezing point of the water to the desired extent. Temperatures as low as −40° F. may be withstood when sufficient alcohol is used.

Among the advantages of the process are that particulated solid materials, e.g., sand, are readily conveyed in an emulsion as pumpable slurry through either the well casing, tubing string, or open well bore into the desired formation; the injection of the slurry is not seriously impeded by the emulsions as these readily enter fluid permeable earth, particularly when preceded by an injection of oil or other breakdown liquid; the particulated solids are rapidly released from suspension in the conveying media as these lose their emulsified condition in the interstices of the earth formation; because the particulated solids are released from the conveying medium as the slurry permeates the earth formation no further treatment of the earth formation is required following the injection of the slurry and time is saved in putting the well back into production and obtaining pipe line oil.

The following examples are presented as illustrative of the practice of this invention:

*Example*

About 100 pounds of compound 20–1 (shown in the following table) are dissolved in about 140 gallons of kerosene, thereby making a solution which is to become the external phase of a water-in-oil type of emulsion. To the mixture so-obtained is added about 350 gallons of 5 percent aqueous hydrochloric acid solution and the resulting mixture is stirred until a thick creamy emulsion is obtained. 400 pounds of sand is then stirred into the emulsion, thereby producing an emulsion-sand slurry which is then ready for injection into an oil well as in treating producing formations. The injection of the slurry is preceded by an injection of oil to break-down the formation. A chaser of oil is used to displace the slurry from the well into the well's productive formation. After the injection of the slurry into the well's productive formation, the emulsion breaks thereby depositing the sand from the emulsion in passages in the producing formation. Following the injection, the well is swabbed. The sand remains behind while oil flows freely from the formation into the well.

Suitable fracturing emulsions are also prepared in this manner from the compounds listed below.

COMPOUNDS USED IN FRACTURING WELLS

| Ex. No. | I | | Weight of Oxides added to I (grams) |
|---|---|---|---|
| | Reactants (grams) | $H_2O$ eliminated (grams) | |
| 20–1 | 1a (439)+oleic acid (846) | 54 | None. |
| 20–2 | 1a (439)+oleic acid (846) | 72 | Do. |
| 20–3 | 1a (439)+lauric acid (600) | 54 | Do. |
| 20–4 | 1a (439)+lauric acid (600) | 72 | Do. |
| 20–5 | 2a (568)+stearic acid (852) | 54 | Do. |
| 20–6 | 3a (697)+stearic acid (852) | 54 | Do. |
| 20–7 | 3a (697)+stearic acid (852) | 72 | Do. |
| 20–8 | 1b (492)+stearic acid (568) | 36 | Do. |
| 20–9 | 2c (774)+lauric acid (600) | 54 | Do. |
| 20–10 | 1d (650)+lauric acid (800) | 72 | Do. |
| 20–11 | 1d (660)+lauric acid (800) | 108 | Do. |
| 20–12 | 3d (1004)+oleic acid (1128) | 72 | Do. |
| 20–13 | 16d (800)+oleic acid (1128) | 72 | Do. |
| 20–14 | 1a (439)+oleic aicd (846) | 54 | Pro (174). |
| 20–15 | 1a (439)+oleic aicd (846) | 54 | BUO (144). |
| 20–16 | 1a (439)+oleic acid (846) | 54 | Octylene oxide (256). |
| 20–17 | 1a (439)+oleic acid (846) | 54 | Styrene oxide (260). |

| Ex. No. | I | | Weight of oxides added to I in alphabetical order (grams) |
|---|---|---|---|
| | Reactants (grams) | $H_2O$ eliminated (grams) | |
| 20–18 | 23a (1960) | | (A) PrO (580). |
| 20–19 | 23a (1960)+lauric acid (600) | 120 | (A) PrO (116) (B) EtO (1320). |
| 20–20 | 28aO (3054)+stearic acid (234) | 18 | |
| 20–21 | 28aAOA | | |
| 20–22 | 28b (1400) | | EtO (1980). |
| 20–23 | 28b (1400)+oleic acid (564) | 40 | EtO (2640). |
| 20–24 | 28bAOA | | |
| 20–25 | 29b (1635) | | (A) PrO (522) (B) EtO (1980). |
| 20–26 | 29b (1635)+oleic acid (282) | 18 | EtO (1320). |
| 20–27 | 29bO (2655)+oleic acid (282) | 18 | |
| 20–28 | 29bAOA | | |
| 20–29 | 30b (1530) | | EtO (2200). |
| 20–30 | 30b (1580)+stearic acid (569) | 40 | |
| 20–31 | 30b (1530)+stearic acid (569) | 40 | (A) PrO (464) (B) EtO (1320). |
| 20–32 | 30bAOA | | |

5. USE IN A PARAFFIN SOLVENT

This phase of our invention relates to the use of the aforementioned compositions in a process for preventing and/or removing accumulations of solid matter from oil wells and pipe lines, and thereby improving their productivity and capacity.

In many oil wells, deposits of paraffin, wax, asphaltic and bituminous organic solids, and similar materials accumulate in objectionable quantities on the face of the producing formation, on the screen or liner, or in the pump, the casing or the tubing of the well. Such deposits operate to decrease materially the productivity of the wells in which they occur. Similarly, deposits of the same character are found in some oil flow lines and oil pipe lines where they effectively reduce the capacity of the pipes, sometimes to the point where little or no fluid can be passed through such conduits in the normal manner of operation.

The accumulations with which this phase of the invention is concerned are to be distinguished at the outset from accumulations of mud solids in the form of mud sheaths. The present deposits quite naturally and frequently contain minor proportions of inorganic materials like sand or shale fragments from the productive formation, or minor proportions of residual drilling mud solids of the character of clay or weighting materials. They are, however, essentially organic in character, whereas, drilling mud solids are essentially inorganic in nature.

Further to distinguish the two types of deposits and the character of the respective problems they present, it should be noted that mud solids are ordinarily deposited in a well, or in or on a geological formation penetrated by a well, as a result of the drilling operation or some subsequent servicing operation, like "killing" the well with mud. Such man-produced mud deposits or mud sheaths constitute non-recurring deposits. Once such a deposit or sheath has been removed, it seldom again appears or occurs in that well.

On the contrary, the organic deposits, with the removal of which this present process is concerned, are essentially progressive deposits produced naturally during the operation of the well and its accessories. Whereas the mud sheaths occur only at the geological formations penetrated during drilling of the well, the present organic deposits may occur at or in the formation, at various levels in the well itself, or at various points in the transportation lines reaching from the well to the refinery, including tanks. Their deposition is progressive; or, if they are removed periodically, they may be said to be recurring. Such removal is usually only intentionally achieved; but in some instances, such organic deposits "slough off" their supporting metallic structure. In such instances they give the appearance of being recurring because continuing deposition soon produces a new accumulation of appreciable and detectable proportions.

Although such organic deposits may at times contain minor proportions of inorganic materials like sand, such inorganic components are not material to the deposition of the organic accumulations, their essential characteristics, or their removal by the process constituting this phase of our invention. In a sense, the minor inorganic constituents are the result of entrapments by the waxy, sticky, or gummy organic material constituting the bulk of the ultimate deposit.

The purpose of removing such deposits is obvious. In some areas wells decline in productivity, at a more or less rapid rate, because of deposition of such deposits on the face of the producing formation. In some cases, the decline is sufficiently rapid that the wells must be serviced in some manner or other at a frequency ranging from several days to several weeks. In some instances, the deposition is so slow that servicing at long intervals is sufficient to maintain the well at a satisfactory level of productivity. The same is true of the various conduits through which the oil travels from the well to the refinery; and periodic servicing of such elements is also required. The capacity of a conduit of circular cross-section is reduced greatly by such deposits, usually well beyond the reduction expected from the ratio of effective cross-sectional areas of the clean conduit and the fouled conduit. Where organic deposits of the present type occur on formation walls, well productivity may fall substantially to zero, especially in low-pressure fields. Pipe capacities are frequently reduced to a small fraction of their capacities when clean. Ultimately, of course, such pipes may be found completely clogged by such deposits. In the case of pipe lines, the operator may find himself burdened with the cost of a 6″ or 8″ line, yet benefitting from a capacity equal to that of a 3″ or 4″ line.

The process which constitutes this phase of the present invention consists in subjecting such clogging organic deposits of wax, paraffin, asphaltic or bituminous substances and the like, to the action of the compounds of this invention, to the end that such deposits are removed from the surfaces to which they were originally adherent. By means of the process, the productivity of wells is restored as is the capacity of flow lines, pipe lines, traps, tanks, pumps, and other equipment, through which such oil travels from formation to refinery.

It will be obvious that if the first minute deposit of such organic materials is subjected to our reagent, and if such application of reagent is practiced continuously or periodically with sufficient frequency, the operation has the appearance of a preventive process rather than a corrective process. In addition, it should be noted that our reagent has a more real claim to acting as a preventive, in that surfaces effectively cleaned by its application tend to resist renewed deposition of such materials, and to remain clean and operative for longer periods than if the reagent had not been applied. Therefore, we have characterized our process as being both a preventive and a corrective one. It may obviously be applied in either sense and achieve the same ultimate goal, the improvement of efficiency of operation of wells and equipment. In the appended claims, we have used the word "removing." It should be clearly understood that we thereby include the prevention of organic deposits of the present kind.

The reagent which we employ in practicing our process consists of the compounds of our invention generally used in combination with one or more water-insoluble organic liquids capable of acting as an oil solvent.

We prefer to employ our reagent in the form of a relatively stable aqueous dispersion. By "relatively stable aqueous dispersion" we mean one that is not resolved into its components spontaneously, on standing for protracted periods of time, e.g., for more than one hour. However, it may be employed in undiluted form or dispersed in oil. In general we have found the aqueous dispersions to be somewhat more effective. Sometimes such aqueous dispersions will be effective, whereas the undiluted reagent or its non-aqueous dispersion or solution will be substantially ineffective.

Depending upon the choice of compound and its molecular weight, the solubility may be expected to range from ready water-solubility in the free state substantially to water-insolubility. The salts, and specifically the acetates, generally show improved water-solubility over the simple compound; and we have obtained the best results by using salt forms which possess appreciable water-solubility.

The other component of our reagent is a water-insoluble organic liquid which is capable of acting as an oil solvent. Many materials lend themselves to this use. One of the most common is the aromatic fraction of petroleum distillates. Another is the fraction removed from distillates by application of the Edeleanu liquid sulfur dioxide extraction process, and which comprises aromatic and unsaturated compounds. In some cases, stove oil or similar petroleum distillate is usable. Solvents like carbon tetrachloride or carbon disulfide are usable, although their comparatively high cost militates against their use. Amylene dichloride is sometimes a desirable material for the present purpose, as are tetrachloroethane, tetralin, trichloroethylene, benzol and its homologues, cyclohexane, etc. This component of our reagent must be water-insoluble and must be an oil solvent. Otherwise, its selection is not limited although it should be compatible with the other ingredient of our reagent. Naturally, its cost and availability will influence the selection. We prefer to use an aromatic petroleum solvent since it is a widely available reagent of low cost and has good properties for the present use.

We do not desire to be limited to any specific water-insoluble organic liquid. All that is required is that it shall be capable of acting as an oil solvent. The choice of liquid employed, however, can be influenced in part by the bottom-hole temperatures expected to be encountered. The character of the oil being produced can also affect the choice. The choice will frequently depend on relative cost of solvents. We have found that a mixture of organic liquids having the specific property of dissolving petroleum oil is very effective. One such mixture which we have employed contains benzol, toluol, carbon tetrachloride, carbon disulfide, tetralin and kerosene.

To prepare our reagents, one simply mixes the two components together in suitable proportions. The optimum proportion of each will vary, depending upon its properties; but in general, the resulting mixture should be homogeneous.

We also prefer that the finished reagent produce a relatively stable aqueous dispersion in water. In cases where the two ingredients form thoroughly homogeneous mixtures, which, however, are not water-dispersible, transformation of the compounds of this invention into their salt form will sometimes render the solution water-dispersible. In such cases we have preferably employed acetic acid to effect the neutralization.

The reagents are preferably employed in the form of an aqueous dispersion, although sometimes favorable results are obtained merely by introducing the undiluted reagent into the well whose productivity is to be improved. In some of such cases, undoubtedly, there is produced in the well bore or in the formation, an aqueous dispersion of the reagent in water present in such bore or such formation. Production of an aqueous dispersion from our reagent and water is accomplished almost spontaneously on mixing the two, in most cases. We greatly prefer to employ the reagents in the form of an aqueous dispersion because in that manner the two components are prevented from separating from each other before the reagent can become effective to remove the deposit of organic materials.

The present reagents have certain advantages over other reagents which have been suggested for the same purpose. For example, the present reagents have been found to be quite stable in the presence of fairly saline water and in the presence of fairly hard water over a period ranging from at least several hours to at least several days. Reagents like those of U.S. Patent No. 1,892,205, to De Groote, dated December 27, 1932, which include sulfonated saponifiable oil, react with hard water to produce insoluble precipitates of such sulfonated saponificable oil; and such constituents of such reagents are "salted out" by saline waters. The present reagents, in contract, are uneffected by waters of appreciable salinity and/or hardness. In fact, as stated above, we have made them into aqueous dispersions of good stability using such waters.

It is also noteworthy that our present reagents are useful in the presence of acids. They can therefore be applied satisfactorily to wells that have been acidized by the use of hydrochloric or hydrofluoric or other acids. The reagents of the above-mentioned Patent No. 1,892,205 would react with such acidizing acids to liberate free sulfonated fatty acids which would either be water-insoluble per se or else would readily become water-insoluble on hydrolysis and loss of their acid sulfate radical. The present reagents would be quite stable in the presence of such acidizing acids.

We prefer to employ a considerable excess of our compounds over the amount required to effect dispersion of the water-insoluble organic liquid in water. Such excess further prevents any separation of the phases, thereby enhancing the stability of the dispersion to such an extent that it will remain stable for at least several hours. The excess also acts to lower the surface tension of the whole reagent so that the reagent exhibits a marked penetrating effect and is carried into the crevices and irregularities of the deposit, weakening the bond between the deposit of organic materials and the supporting wall.

The proportions of oil solvent and active compounds of this invention can be varied within wide limits. For example, we have prepared our reagents in a form in which they contain 4 parts of active compound to 1 part of oil solvent. We have likewise prepared them in a form in which they contain 4 parts of oil solvent to 1 part of active compound. Both forms were relatively stable and did not separate appreciably into their components on standing for protracted periods of time. We have likewise prepared our reagents in a form in which they contain 9 parts of active compound and 1 part of oil solvent; and in a form in which they contain 1 part of active compound and 9 parts of oil solvent. We have determined that the proportion of active compound and oil solvent can advantageously vary within the range of 9:1 and 1:9.

As a preferred example of reagent we employ a 20 weight percent dispersion of active compound in an aromatic petroleum solvent and include 2% of concentrated acetic acid in the finished reagent where the salt form is desired. We prefer to employ this reagent in the form of a dilute aqueous dispersion of about 5 weight percent concentration. Sometimes aqueous dispersions containing as little as 1% of the reagent are fully effective. Sometimes it is desirable to introduce the reagent in the form of a more concentrated aqueous dispersion as when additional water is expected to be encountered in the well bore or the surrounding formation. The reagent can even be introduced in undiluted form although, as stated above, we prefer not to use it in this form.

From the foregoing, it will be understood that this phase of our invention includes subjecting a deposit of organic materials of the kind mentioned to the action of a reagent of the kind described. It should be understood that while our reagent includes, as an indispensable ingredient, a constituent which might constitute a wax solvent, it does not commonly operate completely to dissolve or completely to disperse any waxy organic deposit to which it may be applied in the practice of our invention. Of course, a minor portion of such deposit may be truly dissolved or dispersed by the reagent; but the usual fact is that the deposit is dislodged and brought to a trap or tank that can be more readily cleaned of the organic materials. The same statement applies to other types of organic matter which are found in such deposits. The reagent is usually applied in such small and economical amounts that it could not dissolve completely, or even satisfactorily, the organic deposit to which its action is directed. Its manner of operation is uncertain; but its effects are frequently striking. Well productivity usually increases promptly. Line pressures which have increased with deposition of the organic matter drop to normal within a short time; and sometimes sizeable chunks of the dislodged deposit are observed in open flows from wells or lines, or on screens inserted into such flows for purposes of observation.

Our reagents can be applied in a large number of different ways depending upon the character of the organic deposit it is desired to remove and on the location of such deposit. If the productivity of a well has declined to undesirably low levels, and the clogging deposit is found at the formation, it may be preferable to introduce the reagent, either in undiluted form, or as an aqueous dispersion, into the fluids being produced from the well, and then tie the tubing back into the casing of the well and circulate the fluids being produced. In this manner chemicalized well fluids are passed over the deposit for a period of from several hours to several days, usually with a striking improvement in well productivity when circulation is stopped and normal production of the well is resumed.

Sometimes the deposit is located at some higher or lower level in the tubing. For example, passage of the well fluids past a point in the well which lies opposite a water sand may produce a deposit at that point, because such a water sand commonly represents a point of cooling. In treating tubing deposits, the circulation method above may be practiced. However, in some instances, it is possible to introduce the reagent in undiluted or diluted form into the tubing at the well head by unscrewing the stuffing box. (Usually the tubing does not stand entirely full of fluid because of slight leakage past the pump.) If the reagent is introduced as an aqueous dispersion, it will settle relatively slowly down through the oil in the tubing until it reaches the deposit. After introducing the reagent in any desired manner, it may be allowed to stand in the tubing for any desired period of time before the well is replaced on production. In some instances it is preferred to pump the well intermittently for very short periods of time so as to pick up the reagent and lift it above the deposit and let it settle down past the deposit again during the next idle period.

Where the organic deposits in question occur in flow lines, the reagent may be introduced and allowed to "soak" the deposit. Thereafter, normal production may be resumed; and the dislodged deposit flushed from the line by the flow of well fluids. In other instances, gas pressure is put on the soaked line and the deposit flushed out in that manner. Sometimes introduction of a dilute aqueous dispersion of the reagent is effected intermittently and the deposit progressively removed. Or the reagent may be introduced in a continuous fashion, if desired.

In the case of pipe lines, the diameter of the pipe and the length of the line make it necessary to apply the reagent in the most economical fashion possible. In such cases we have found that very dilute aqueous dispersions are useful, e.g., of 1 weight percent concentration or sometimes even less. Soaking of the line, i.e., merely introducing the reagent dispersion into it and allowing the line to lie idle for a period of time, is practicable. Sometimes we prefer to prepare a relatively large volume of dilute aqueous dispersion in a tank at some convenient location at one end of the pipe line and interrupt the pumping of oil only long enough to switch to the solution tank and pump the volume of reagent dispersion into the line. Then the pumping of oil is resumed and the liquid cylinder of reagent dispersion is thereby moved across the face of the deposit in the line over the whole length of line. If desired, the direction of pumping may be reversed when such liquid cylinder of reagent dispersion reaches the opposite end of the line; and a second, or even a third pass, or more, may be made of reagent dispersion over the deposit in the line.

Where deposits have been allowed to accumulate over a considerable period of time, they may be of such proportions that application of a normal amount of our reagent would produce sloughing off of sufficient of the deposit to plug the conduit further downstream by forming a bridge with undislodged deposit at that point. In such instances, we prefer to proceed more cautiously, introducing successive small portions of reagent and successively dislodging portions of the deposit sufficiently small to pass freely through the limited freeway in the conduit.

Merely introducing our reagent into an area containing a deposit so the reagent contacts the deposit is sometimes sufficient to cause the removal of the latter. Sometimes agitation of the reagent at the face of the deposit greatly accelerates removal of the latter. Any suitable agitation means may be employed in such instances.

Because there are so many conditions under which such organic deposits may occur, it is difficult to give any preferred procedure for applying our reagent. The foregoing descriptions have covered instances where such deposits were to be removed from the face of the formation, the well tubing or casing, flow lines, and pipe lines. They may be taken as preferred methods of operating the process for the respective conditions outlined. All of them are exemplary only. The process may be varied as conditions may require. In all cases, the process consists broadly in the application of our reagent to the organic deposits described above.

Application of our reagent upstream in any system, as, for example, into a well, results in an attack on any such organic deposits further downstream. For example, wax or similar deposits, in traps and tanks, are freed and usually flowed out of such vessels in subsequent operation of the system. In the case of tanks we have found that waxy tank bottoms may sometimes be removed by introducing our reagent into the tank containing such deposits and allowing the whole to soak for a period of time. The deposit is thereby made more free and more readily removable. Removal of deposits of organic matter from oil production equipment, such as traps and tanks and the like, is obviously contemplated by our process.

The following examples are presented for purposes of illustration:

*Example 22–1*

An oil well producing crude oil at the average rate of about 6 barrels per day is taken out of production. About 160 gallons of a 5 weight percent aqueous dispersion of a reagent consisting of 20 weight percent of compound 22–1 of the following table in an aromatic petroleum solvent is forced into the well annulus until a back pressure of about 350 p.s.i. is obtained, in contrast to the natural formation pressure of about 250 p.s.i., so that the solution is forced into the formation under a differential pressure of about 100 p.s.i. The well is maintained under this back pressure for about 25–30 hours. Then the pressure is released and the well placed in production.

*Example 22–2*

An oil well producing at the average rate of about 6 barrels a day is treated in the manner of Example 22–1 except that compound 22–2 of the following table is employed.

The compounds shown in the following table are effective in paraffin solvents.

ADDITIVE FOR PARAFFIN SOLVENT

| EX. NO. | I | | Weight of Oxides added to I (grams) |
|---|---|---|---|
| | Reactants (grams) | $H_2O$ Eliminated (grams) | |
| 22–1 | 1a (439)+lauric acid (600) | 54 | EtO (352). |
| 22–2 | 1a (439)+Lauric acid (600) | 72 | EtO (440). |
| 22–3 | 1a (439)+oleic acid (846) | 54 | EtO (440). |
| 22–4 | 1a (439)+oleic acid (846) | 72 | EtO (528). |
| 22–5 | 2a (568)+stearic acid (852) | 54 | EtO (440). |
| 22–6 | 2a (568)+stearic acid (852) | 72 | EtO (440). |
| 22–7 | 3a (697)+stearic acid (852) | 54 | EtO (396). |
| 22–8 | 3a (697)+stearic acid (852) | 72 | EtO (616). |
| 22–9 | 1b (492)+lauric acid (400) | 36 | EtO (440). |
| 22–10 | 2b (662)+oleic acid (564) | 36 | EtO (572). |
| 22–11 | 1c (645)+lauric acid (600) | 54 | EtO (440). |
| 22–12 | 1c (645)+lauric acid (600) | 72 | EtO (352). |
| 22–13 | 1d (660)+oleic acid (1128) | 72 | EtO (660). |
| 22–14 | 2d (832)+lauric acid (800) | 72 | EtO (440). |
| 22–15 | 16d (800)+lauric acid (800) | 72 | EtO (660). |

| Ex. No. | I | | Weight of Oxides added to I in alphabetical order (grams) |
|---|---|---|---|
| | Reactants (grams) | $H_2O$ Eliminated (grams) | |
| 22–16 | 28a (1960) | | (A) PrO (580). |
| 22–17 | 28a (1960)+lauric acid (600). | 120 | (A) PrO (116) (B) EtO (1320). |
| 22–18 | 28aO (3054)+stearic acid (284). | 18 | |
| 22–19 | 28aAOA | | |
| 22–20 | 28b (1400) | | EtO (1980). |
| 22–21 | 28b (1400)+oleic acid (564). | 40 | EtO (2640). |
| 22–22 | 28bAOA | | |
| 22–23 | 29b (1635) | | (A) PrO (522) (B) EtO (1980). |
| 22–24 | 29b (1635)+oleic acid (282). | 18 | EtO (1320). |
| 22–25 | 29bO (2655)+oleic acid (282). | 18 | |
| 22–26 | 29bAOA | | |
| 22–27 | 30b (1580) | | EtO (2200). |
| 22–28 | 30b (1580)+stearic acid (569). | 40 | |
| 22–29 | 30b (1580)+stearic acid (569). | 40 | (A) PrO (464) (B) EtO (1320). |
| 22–30 | 30bAOA | | |

We claim:

1. A process for injecting water into an underground formation characterized by employing an aqueous solution of a member selected from the group consisting of: (1) acylated, (2) oxyalkylated, (3) acylated then oxyalkylated, (4) oxyalkylated then acylated, (5) acylated then oxyalkylated and then acylated, monomeric polyaminomethyl phenols characterized by reacting a preformed methylol phenol having one to four methylol groups in the 2, 4, 6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

2. The process of claim 1 where the preformed methylol phenol is 2,4,6-trimethylol phenol, the polyamine is a polyalkylene polyamine, the acylation agent is a monocarboxy acid having 7 to 39 carbon atoms, and the oxyalkylation agent is a 1,2-alkylene oxide having 2 to 4 carbon atoms.

3. The process of claim 1 where the member is an acylated then oxyalkylated monomeric polyaminomethyl phenol.

4. The process of claim 3 where the preformed methylol phenol is 2,4,6-trimethylol phenol, the polyamine is diethylene triamine, the acylating agent is oleic acid, and the oxyalkylation agent is ethylene oxide.

5. A method of rendering preferentially oil wettable the oil-bearing siliceous formation surrounding an oil well bore hole characterized by treating said formation with a member selected from the group consisting of: (1) acylated, (2) oxyalkylated, (3) acylated then oxyalkylated, (4) oxyalkylated then acylated, (5) acylated then oxyacylated then oxyalkylated monomeric polyaminomethyl phenols characterized by reacting a preformed methylol phenol having one to four methylol groups in the 2,4,6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

6. The process of claim 5 where the preformed methylol phenol is 2,4,6-trimethylol phenol, the polyamine is a polyalkylene polyamine, the acylation agent is a monocarboxy acid having 7 to 39 carbon atoms, and the oxyalkylation agent is a 1,2-alkylene oxide having 2 to 4 carbon atoms.

7. The process of claim 5 where the member is an acylated monomeric polyaminomethyl phenol.

8. The process of claim 7 where the preformed methylol phenol is 2,4,6-trimethylol phenol, the polyamine is diethylene triamine, and the acylating agent is oleic acid.

9. A process for the removal of the mud sheaths from geological formations penetrated in the drilling of wells characterized by applying thereto a member selected from the group consisting of: (1) acylated, (2) oxyalkylated, (3) acylated then oxyalkylated, (4) oxyalkylated then acylated, (5) acylated then oxalkylated and then acylated, monomeric polyaminomethyl phenols characterized by reacting a preformed methylol phenol having one to four methylol groups in the 2,4,6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

10. The process of claim 9 where the preformed methylol phenol is 2,4,6-trimethylol phenol, the polyamine is a polyalkylene polyamine, the acylation agent is a monocarboxy acid having 7 to 39 carbon atoms, and the oxyalkylation agent is a 1,2-alkylene oxide having 2 to 4 carbon atoms.

11. The process of claim 9 where the member is an acylated then oxyalkylated monomeric polyaminomethyl phenol.

12. The process of claim 11 where the preformed methylol phenol is 2,4,6-trimethylol phenol, the polyamine is diethylene triamine, the acylating agent is oleic acid, and the oxyalkylation agent is ethylene oxide.

13. A method for treating an earth formation penetrated by the bore of a well characterized by forming a slurry of a particulated solid material in a pumpable emulsion comprising water, oil, and an emulsifying agent, introducing said slurry into the well so as to bring it in contact with the earth formation to be treated, and applying sufficient pressure to fracture the earth formation.

said particulated solid remaining suspended in the emulsion and said emulsion remaining unresolved until injected into the earth formation and therein breaking to release the particulated solid material from suspension in the emulsion and depositing the particulated solid in the earth formation, said emulsifying agent comprising a member selected from the group consisting of: (1) acylated, (2) oxyalkylated, (3) acylated then oxyalkylated, (4) oxyalkylated then acylated, (5) acylated then oxyalkylated and then acylated, monomeric polyaminomethyl phenols characterized by reacting a preformed methylol phenol having one to four methylol groups in the 2,4,6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

14. The process of claim 13 where the preformed methylol phenol is 2,4,6-trimethylol phenol, the polyamine is a polyalkylene polyamine, the acylation agent is a monocarboxy acid having 7 to 39 carbon atoms, and the oxyalkylation agent is a 1,2-alkylene oxide having 2 to 4 carbon atoms.

15. The process of claim 13 where the member is an acylated monomeric polyaminomethyl phenol.

16. The process of claim 15 where the preformed methylol phenol is 2,4,6-trimethylol phenol, the polyamine is diethylene triamine, and the acylating agent is oleic acid.

17. A process for removing deposits of organic matter from oil well equipment characterized by applying thereto a member selected from the group consisting of: (1) acylated, (2) oxyalkylated, (3) acylated then oxyalkylated, (4) oxyalkylated then acylated, (5) acylated then oxyalkylated and then acylated, monomeric polyaminomethol phenols characterized by reacting a preformed methylol phenol having one to four methylol groups in the 2,4,6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and the an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

18. The process of claim 17 where the preformed methylol phenol is 2,4,6-trimethylol phenol, the polyamine is a polyalkylene polyamine, the acylation agent is a monocarboxy acid having 7 to 39 carbon atoms, and the oxyalkylation agent is a 1,2-alkylene oxide having 2 to 4 carbon atoms.

19. The process of claim 17 where the member is an acylated then oxyalkylated monomeric polyaminomethyl phenol.

20. The process of claim 19 where the preformed methylol phenol is 2,4,6-trimethylol phenol, the polyamine is diethylene triamine, the acylating agent is oleic acid, and the oxyalkylation agent is ethylene oxide.

References Cited in the file of this patent

UNITED STATES PATENTS

| | | |
|---|---|---|
| 2,470,830 | Monson | May 24, 1949 |
| 2,802,531 | Cardwell et al. | Aug. 13, 1957 |
| 2,836,559 | Bock et al. | May 27, 1958 |
| 2,901,430 | Chiddix et al. | Aug. 25, 1959 |
| 2,907,791 | Schmitz et al. | Oct. 6, 1959 |
| 2,946,759 | Gallant et al. | July 26, 1960 |
| 2,998,452 | Bruson et al. | Aug. 29, 1961 |